US011516683B2

(12) United States Patent
Harada

(10) Patent No.: US 11,516,683 B2
(45) Date of Patent: Nov. 29, 2022

(54) TERMINAL, RADIO COMMUNICATION METHOD, BASE STATION AND SYSTEM FOR MEASUREMENTS USING A SYNCHRONIZATION SIGNAL BLOCK

(71) Applicant: NTT DOCOMO, INC., Tokyo (JP)

(72) Inventor: Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 55 days.

(21) Appl. No.: 16/961,308

(22) PCT Filed: Jan. 11, 2018

(86) PCT No.: PCT/JP2018/000484
§ 371 (c)(1),
(2) Date: Jul. 10, 2020

(87) PCT Pub. No.: WO2019/138500
PCT Pub. Date: Jul. 18, 2019

(65) Prior Publication Data
US 2021/0084511 A1    Mar. 18, 2021

(51) Int. Cl.
*H04W 24/08* (2009.01)
*H04W 36/00* (2009.01)

(52) U.S. Cl.
CPC ....... *H04W 24/08* (2013.01); *H04W 36/0085* (2018.08)

(58) Field of Classification Search
CPC . H04W 24/08; H04W 24/10; H04W 36/0088; H04W 36/0058; H04W 76/15;
(Continued)

(56) References Cited

U.S. PATENT DOCUMENTS 8,868,084 B2 * 10/2014 Aoyagi ............ H04W 36/0088
455/437
10,425,264 B2 * 9/2019 Ko ...................... H04L 27/2602
(Continued)

FOREIGN PATENT DOCUMENTS

EP         3636016 A1    4/2020
WO   WO-2021001946 A1 *  1/2021  ............ H04W 24/10

OTHER PUBLICATIONS

D. Laselva et al., "UE Measurements Relaxation for UE Power Saving in 5G New Radio," 2021 IEEE 94th Vehicular Technology Conference (VTC2021-Fall), 2021, pp. 1-6, doi: 10.1109/VTC2021-Fall52928.2021.9625488. (Year: 2021).*

(Continued)

*Primary Examiner* — William D Cumming
(74) *Attorney, Agent, or Firm* — Osha Bergman Watanabe & Burton LLP

(57) ABSTRACT

A terminal includes a receiver that receives information regarding a measurement to be performed in a first serving cell using a synchronization signal block (SSB) and a processor that performs the measurement according to the information and determines whether transmission or reception can be performed using a second serving cell, at a specified timing, based on at least one of an SSB-based measurement timing configuration (SMTC) window duration and an SSB to be measured in regard to the first serving cell. In other aspects, a radio communication method for a terminal, a base station and a system are also disclosed.

20 Claims, 15 Drawing Sheets

(58) Field of Classification Search
CPC .............. H04W 56/001; H04W 56/005; H04W 36/0094; H04W 36/0061; H04W 4/38; H04W 76/27; H04W 52/0216
USPC ......................................... 455/436, 444, 437
See application file for complete search history.

(56) References Cited

U.S. PATENT DOCUMENTS

| | | | | |
|---|---|---|---|---|
| 10,805,821 | B2* | 10/2020 | Gheorghiu | H04W 24/10 |
| 10,993,196 | B2* | 4/2021 | Jung | H04W 56/00 |
| 11,071,000 | B2* | 7/2021 | Si | H04L 5/10 |
| 11,133,967 | B2* | 9/2021 | Ko | H04L 5/0053 |
| 2012/0309396 | A1* | 12/2012 | Aoyagi | H04W 36/0088 455/436 |
| 2018/0198659 | A1* | 7/2018 | Ko | H04L 5/0053 |
| 2018/0324678 | A1 | 11/2018 | Chen et al. | |
| 2018/0324727 | A1* | 11/2018 | Zhou | H04W 72/042 |
| 2019/0052379 | A1* | 2/2019 | Lin | H04L 27/26 |
| 2019/0182000 | A1* | 6/2019 | Futaki | H04L 5/0092 |
| 2019/0261206 | A1* | 8/2019 | Gheorghiu | H04L 27/2646 |
| 2019/0261444 | A1* | 8/2019 | Axmon | H04B 7/0626 |
| 2019/0313272 | A1* | 10/2019 | Zhou | H04W 24/10 |
| 2020/0007371 | A1* | 1/2020 | Ko | H04L 27/2602 |
| 2020/0022011 | A1* | 1/2020 | Lee | H04W 24/10 |
| 2020/0029238 | A1* | 1/2020 | Si | H04W 56/001 |
| 2020/0029315 | A1* | 1/2020 | Lin | H04W 52/0216 |
| 2020/0053670 | A1* | 2/2020 | Jung | H04W 56/0015 |
| 2020/0120521 | A1* | 4/2020 | da Silva | H04L 5/0048 |
| 2020/0145977 | A1* | 5/2020 | Kumar | H04L 5/0048 |
| 2020/0195398 | A1* | 6/2020 | Futaki | H04W 24/10 |
| 2020/0337007 | A1* | 10/2020 | Jung | H04W 72/0453 |
| 2020/0351771 | A1* | 11/2020 | Geekie | H04W 4/38 |
| 2020/0359247 | A1* | 11/2020 | Yi | H04L 5/005 |
| 2020/0404602 | A1* | 12/2020 | Ma | H04W 24/10 |
| 2021/0029572 | A1* | 1/2021 | Harada | H04W 36/0094 |
| 2021/0084511 | A1* | 3/2021 | Harada | H04W 24/08 |
| 2021/0168745 | A1* | 6/2021 | Harada | H04W 56/001 |
| 2021/0212002 | A1* | 7/2021 | Jung | H04W 56/00 |
| 2021/0227417 | A1* | 7/2021 | Wang | H04W 76/27 |
| 2021/0329507 | A1* | 10/2021 | Yao | H04W 36/0061 |

OTHER PUBLICATIONS

J. Liu et al., "Initial Access, Mobility, and User-Centric Multi-Beam Operation in 5G New Radio," in IEEE Communications Magazine, vol. 56, No. 3, pp. 35-41, Mar. 2018, doi: 10.1109/MCOM.2018. 1700827. (Year: 2018).*
International Search Report issued in PCT/JP2018/000484 dated Mar. 27, 2018 (1 page).
Written Opinion of the International Searching Authority issued in PCT/JP2018/000484 dated Mar. 27, 2018 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
3GPP TSG RAN WG1#90b; R1-1717583 "Remaining Issues on the NR Mobility" Samsung; Prague, Czech Republic; Oct. 9-13, 2017 (15 pages).
3GPP TS 38.133 V15.0.0 "3rd Generation Partnership Project; Technical Specification Group Radio Access Network; NR; Requirements for support of radio resource management (Release 15)" Dec. 2017 (41 pages).
Extended European Search Report issued in European Application No. 18900054.0, dated Jun. 29, 2021 (12 pages).
Office Action issued in the counterpart Indian Patent Application No. 202037032817, dated Apr. 4, 2022 (7 pages).
Office Action issued in the counterpart Japanese Patent Application No. 2019-564205, dated Jan. 25, 2022 (8 pages).
Catt; "Gaps for intra-frequency measurement"; 3GPP TSG-RAN WG4 Meeting #85, R4-1712591; Reno, USA; Nov. 27-Dec. 1, 2017 (2 pages).
Ericsson; "Configuration of measurement gap in NR"; 3GPP TSG-RAN WG2 #99bis, Tdoc R2-1711340; Prague, Czech Republic; Oct. 9-13 (4 pages).
MediaTek Inc.; "Gap for Intra-frequency Measurement and Gap Sharing"; 3GPP TSG-RAN WG4 Meeting #85, R4-1712396; Reno, Nevada, USA; Nov. 27-Dec. 1, 2017 (7 pages).
Vivo; "Discussion on Rate Matching"; 3GPP TSG RAN WG1 Meeting #90, R1-1712835; Prague, P.R. Czech, Aug. 21-25, 2017 (5 pages).
MediaTek Inc.; "Discussion on Measurement for Mobility Management"; 3GPP TSG RAN WG1 Meeting #91, R1-1719549; Reno, USA; Nov. 27-Dec. 1, 2017 (11 pages).
MediaTek Inc.; "Further Clarification on MO Configuration with/ without SSB"; 3GPP TSG-RAN WG2 #100, R2-1712887; Reno, USA; Nov. 27-Dec. 1, 2017 (7 pages).

* cited by examiner

TERMINAL, RADIO COMMUNICATION METHOD, BASE STATION AND SYSTEM FOR MEASUREMENTS USING A SYNCHRONIZATION SIGNAL BLOCK

TECHNICAL FIELD

The present disclosure relates to a user terminal and a radio communication method in a next-generation mobile communication system.

BACKGROUND ART

Specifications of Long-Term Evolution (LTE) have been drafted for the purpose of achieving a further increase in data rate, a further reduction in latency, and so on in UMTS (Universal Mobile Telecommunications System) networks (see Non-Patent Literature 1). Specifications of LTE-A (LTE Advanced, LTE Rel. 10, Rel. 11, Rel. 12, and Rel. 13) have been drafted in order to achieve a further increase in capacity, advancement, and so on of LTE (LTE Rel 8 and Rel. 9).

Successor systems to LTE (for example, FRA (Future Radio Access), 5G (5th generation mobile communication system), 5G+ (plus), NR (New Radio), NX (New radio access), and FX (Future generation radio access); also referred to as LTE Rel. 14 or 15 and beyond) are also under study.

In an existing LTE system (for example, LTE Rel. 8 to Rel. 13), a user terminal (UE: User Equipment) detects a synchronization signal (SS), synchronizes with a network (for example, a base station (eNB: eNode B)), and identifies a cell for connection (for example, identifies the cell by using a cell ID (Identifier)). Such a process is referred to as a cell search. The synchronization signal includes, for example, a PSS (Primary Synchronization Signal) and/or an SSS (Secondary Synchronization Signal).

The UE receives broadcast information (for example, master information blocks (MIBs), system information blocks (SIBs), and so on) to acquire configuration information (that may be referred to as system information, or the like) for communication with a network.

The MIBs may be transmitted on a broadcast channel (PBCH (Physical broadcast channel)), and the SIBs may be transmitted on a downlink (DL) shared channel (PDSCH (Physical Downlink Shared Channel).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In a future radio communication system (hereinafter also simply referred to as NR), measurements using synchronization signal blocks (SSBs) are utilized. A UE is notified of a timing configuration related to the measurements using the SSBs (SMTC (SSM-based Measurement Timing Configuration). The UE performs, in a configured SMTC window, the measurements based on the SSBs to be measured.

Judgment of whether data transmission and/or reception is enabled within the SMTC window is also being studied.

However, in a case where the measurements of the SSBs are performed in a plurality of serving cells, uniform judgment of whether data transmission and/or reception within the SMTC window is enabled or disabled disadvantageously leads to an excessive limitation on resources available for data transmission and/or reception or a failure to achieve appropriate measurements. In this case, communication throughput, frequency utilization efficiency, and so on may be degraded.

Thus, an object of the present disclosure is to provide a user terminal and a radio communication method that are capable of suppressing a decrease in throughput and so on even in a case where measurements are performed in a plurality of serving cells.

Solution to Problem

A user terminal according to an aspect of the present disclosure includes a measurement section that performs, on both a first carrier and a second carrier, a same-frequency measurement using a synchronization signal block (SSB), and a control section that judges, based on information for measurement of the SSB for the second carrier, whether data transmission and/or reception using the first carrier is enabled or disabled at a specific timing.

Advantageous Effects of Invention

According to an aspect of the present disclosure, a decrease in throughput and so on can be suppressed even in a case where measurements are performed in a plurality of serving cells.

DESCRIPTION OF EMBODIMENTS

Figure 1:
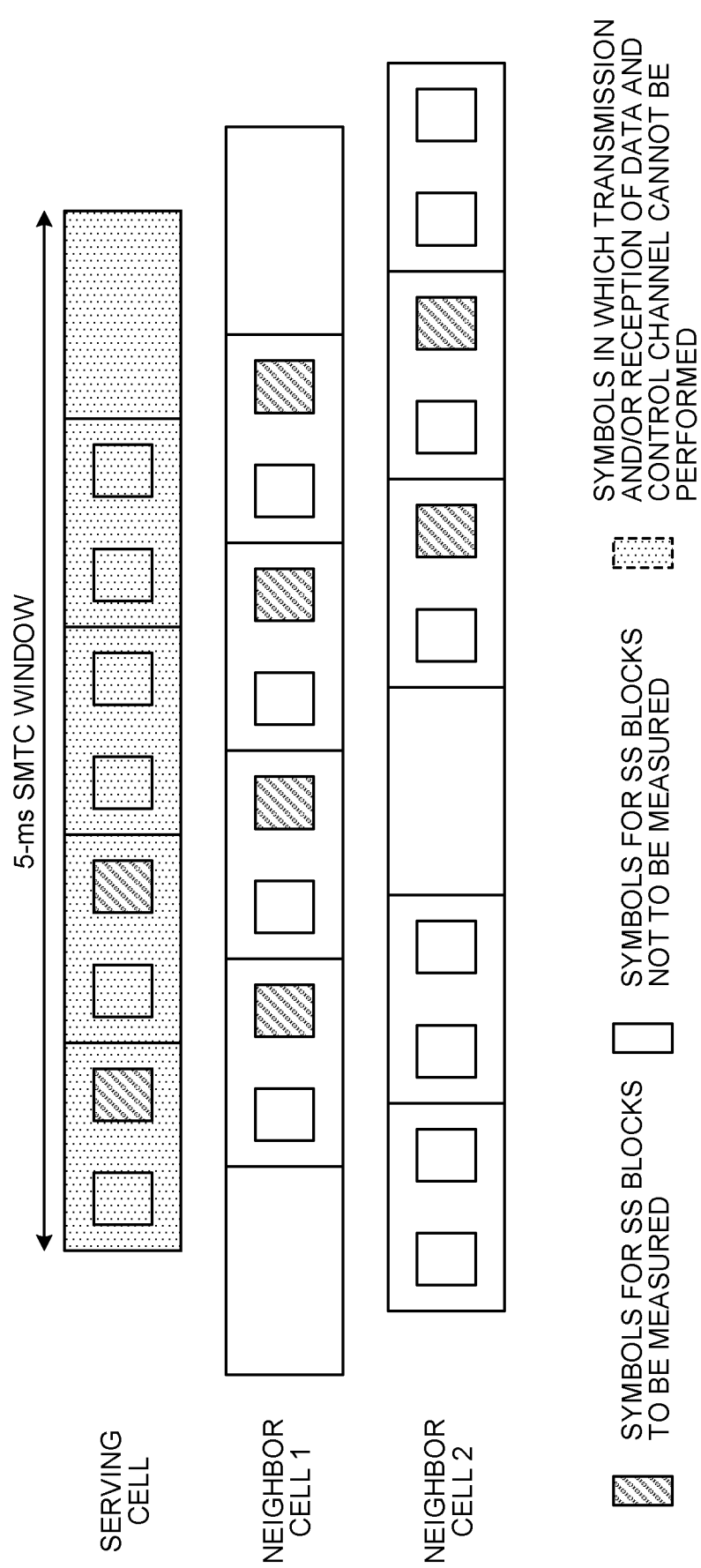
FIG. 1 is a diagram to show an example of an assumption related to measurements of an FR1.

In an existing LTE system, a UE supports different-frequency measurements (inter-frequency measurements) in which measurements are performed in a non-serving carrier different from a serving carrier with which connection has been established.

The UE switches (retunes), at a measurement gap (MG), a used frequency (RF (Radio Frequency)) from the serving carrier to the non-serving carrier, performs measurements by using reference signals and so on, and then switches the used frequency from the non-serving carrier to the serving carrier.

Here, the MG is a period for the different-frequency measurements, and in the period, the UE stops transmission and/or reception with the carrier being used for communication, and perform measurements using a carrier with another frequency.

In LTE, while the different-frequency carrier is being measured using the MG, transmission and/or reception using the serving cell are precluded due to switching of the RF. On the other hand, in the other cases (for example, same-frequency measurements), no transmission and/or reception constrains are imposed in connection with the measurements.

In NR, the following measurements are under study.
(1) Intra-frequency measurements without MG,
(2) Intra-frequency measurements with MG, and
(3) Inter-frequency measurements.

The intra-frequency measurements without MG in (1) described above are also referred to as same-frequency measurements without RF retuning. The intra-frequency measurements with MG in (2) described above are also referred to as same-frequency measurements with RF retuning. For example, in a case where no signal to be measured is included in an active BWP (BandWidth Part), even the same-frequency measurements need RF retuning, and thus the measurements in (2) are performed.

Here, the BWP corresponds to one or more partial frequency bands in a component carrier (CC) configured in NR. The BWP may be referred to as a partial frequency band or a partial band.

The inter-frequency measurements in (3) described above are also referred to as different-frequency measurements. The different-frequency measurements are assumed to use the MG. However, different-frequency measurements without MG can be performed in a case where the UE reports the UE capability of gapless measurements to a base station (that may be referred to as, for example, a BS (base station), a transmission/reception point (TRP), an eNB (eNodeB), or a gNB (NR NodeB)).

In NR, while the same-frequency carrier or a different-frequency carrier is being measured by using the MG, transmission and/or reception using the serving cell are precluded due to switching of the RF.

In LTE, NR, and so on, for the same-frequency measurements and/or different-frequency measurements, at least one of reference signal received power (RSRP), a received signal strength (RSSI (Received Signal Strength Indicator)) and a reference signal received quality (RSRQ), and an SINR (Signal to Interference plus Noise Ratio) of the non-serving carrier may be measured.

Here, the RSRP is received power of a desired signal and is measured, for example, using at least one of a cell-specific reference signal (CRS), a channel state information-reference signal (CSI-RS), and so on. The RSSI is a total received power including received power of a desired signal, interference, and noise power. The RSRQ is the ratio of the RSRP to the RSSI.

The desired signal may be a signal included in a synchronization signal block (SSB). The SSB is a signal block including a synchronization signal (SS) and a broadcast channel (also referred to as a broadcast signal, a PBCH, an NR-PBCH, or the like) and may be referred to as an SS/PBCH block or the like.

The SS may include a PSS (Primary Synchronization Signal), an SSS (Secondary Synchronization Signal), an NR-PSS, and an NR-SSS. The SSB is constituted of one or more symbols (for example, OFDM symbols). In the SSB, the PSS, the SSS, and the PBCH may be mapped in one or more different symbols. For example, the SSB may be constituted of a total of four or five symbols including one symbol of the PSS, one symbol of the SSS, and two or three symbols of the PBCH.

Note that measurements using the SS (or SSB) may be referred to as SS (or SSB) measurements. As the SS (or SSB) measurements, for example, SS-RSRP, SS-RSRQ, or SS-SINR measurements may be performed.

The UE may communicate (for example, transmit and/or receive signals and perform measurements) using at least one frequency band (carrier frequency) included in a first frequency band (FR1: frequency range 1) and a second frequency band (FR2: frequency range 2).

For example, the FR1 may be a frequency band of 6 GHz or lower (sub-6 GHz), and the FR2 may be a frequency band of higher than 24 GHz (above-24 GHz). The FR1 may be defined as a frequency range for which at least one of sub-carrier spacings (SCSs) of 15, 30, and 60 kHz is used, and the FR2 may be defined as a frequency range for which at least one of SCSs of 60 and 120 kHz is used. Note that the frequency bands, definitions, and so on of the FR1 and FR2 are not limited to the above-described frequency bands, definitions, and so on, and for example, the FR1 may be a frequency band higher than the frequency band of the FR2.

The FR2 may be used exclusively for time division duplex (TDD) bands. The FR2 is preferably synchronized among a plurality of base stations for operation. In a case where the FR2 includes a plurality of carriers, the carriers are preferably synchronized for operation.

The UE may be notified by the base station of (configured by the base station with) information related to the same-frequency measurements and/or different-frequency measurements by using, for example, higher layer signaling, physical layer signaling, or a combination thereof.

Here, the higher layer signaling may be, for example, one of RRC (Radio Resource Control) signaling, MAC (Medium Access Control) signaling, and broadcast information, or any combination thereof.

The MAC signaling may use, for example, MAC control elements (MAC CEs), MAC PDUs (Product Data Units), or the like. The broadcast information may be, for example, master information blocks (MIBs), system information blocks (SIB), or minimum system information (RMSI (Remaining Minimum System Information)).

The information related to the same-frequency measurements and/or different-frequency measurements may include, for example, the frequency bands (carriers) to be measured, presence or absence of synchronization of the carriers to be measured, the positions of resources (slot numbers, symbol numbers, or RB indices) for the signal to be measured, SSB-based measurement timing configuration (SMTC), and indices of SSBs to be measured. The SSB indices may be associated with the positions of resources for the SSBs.

Note that the presence or absence of synchronization of the carriers to be measured may be configured for the UE, for example, by the RRC signaling using information (that may also be referred to as a parameter "useServingCellTimingForSync") regarding whether the carriers to be measured are synchronized with the serving cell (whether SSB indices transmitted by a neighbor cell can be derived based on a timing of the serving cell).

The indices of SSBs to be measured may be notified by using a bitmap (that may be referred to as a parameter "ssb-ToMeasure"). The bitmap may be associated with the frequency band to be measured. For example, the SSB indices may be notified using a bitmap the length of which increases with the higher range of the frequency band to be measured.

The SMTC may include the length, cycle, timing offset, and so on of an SSB measurement period (that may be referred to as an SMTC window, a measurement timing, or the like). The UE performs, in a configured SMTC window, the measurements based on the SSBs to be measured.

UE capability signaling for configuring MGs for different-frequency measurements may be supported. For the UE capability signaling, for example, the MGs for different-frequency measurements can be configured separately for the FR1 and the FR2.

For example, the UE may notify of capability signaling including a MG length or duration, an MG repetition cycle, and so on for the gaps corresponding to at least one of FR1 specific, FR2 specific, and UE specific.

Relationship Between SSB Measurements and Enabling and Disabling of Data Transmission and/or Reception In NR, in a case where a numerology for an RS (for example, SSBs) to be measured is different from a numerology for the data and/or control channel of the serving cell, whether the UE can simultaneously process these signals with the different numerologies may depend on the UE capability. For example, a UE not having the processing capability for simultaneously processing these signals may be assumed to be disabled from performing data transmission and/or reception during the measurements.

Note that the numerology corresponds to, for example, the SCS. In the present disclosure, the term "SCS" may be interpreted as with the numerology. In the present disclosure, the term "data" may be interpreted as at least one of data, a control channel, and a reference signal. For example, the data transmission and/or reception may mean PUCCH/PUSCH transmission and/or PDCCH/PDSCH reception.

In the FR2, the UE is assumed to uses analog beam forming (BF) for receive BF during the measurements. In this case, a case is assumed where directing a beam to the RS to be measured disables data reception from the serving cell. Thus, the UE may be assumed to be disabled from performing the data transmission and/or reception during the measurements in the FR2 regardless of the UE capability.

For NR, to enable flexible control, transmission and/or reception of data on symbols configured with SSBs are also under study. For example, for a case where a UE not capable of simultaneously processing different (or mixed) SCSs performs measurements of the FR1, the following assumption may be made.

(1) In a case where the SCS of the SSBs is different from the data SCS of the serving cell and where an NW does not provide a notification indicating that the carriers to be measured are synchronized, the data transmission and/or reception is disabled on all the symbols in the period configured as the SMTC window.

(2) In a case where the SCS of the SSBs is different from the data SCS of the serving cell and where the NW provides the notification indicating that the carriers to be measured are synchronized, the data reception is disabled only on the SSB symbols to be measured.

Figure 2:
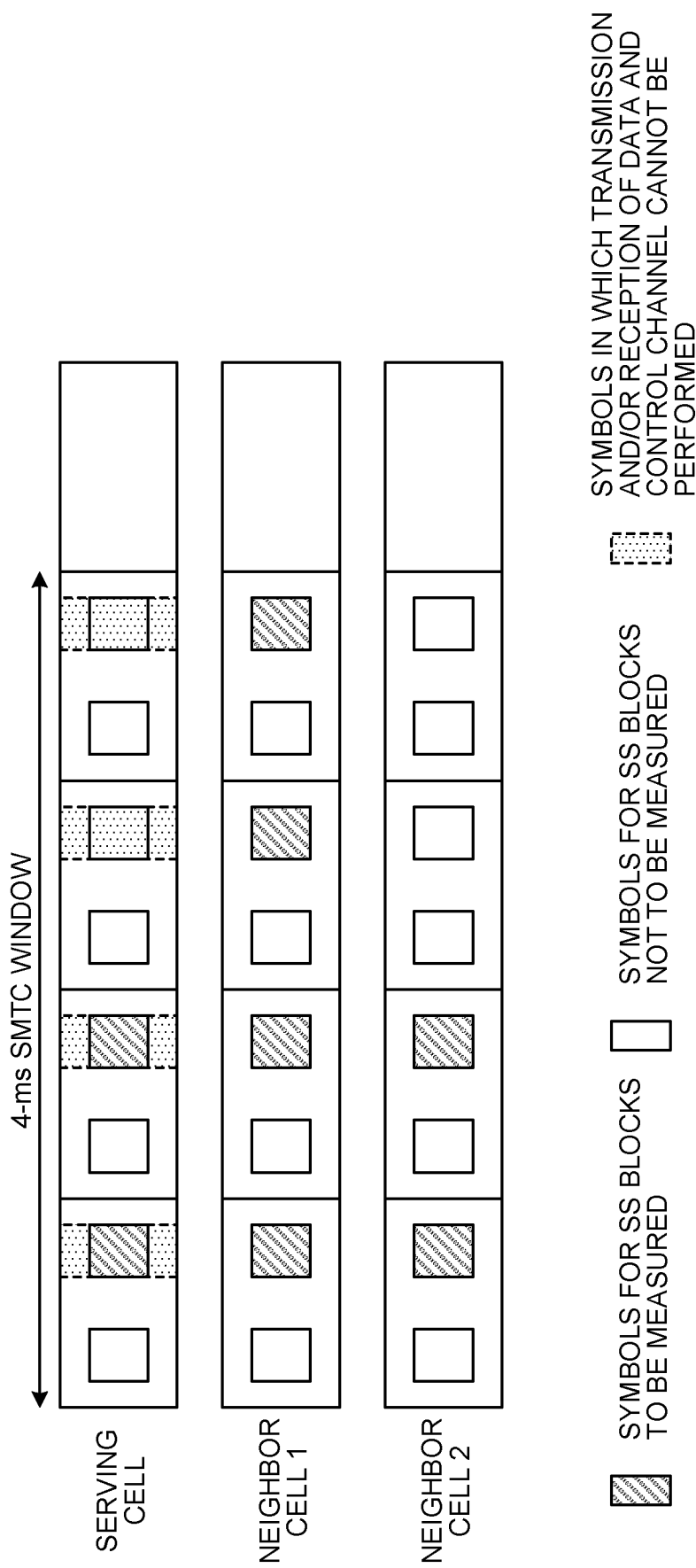
FIG. 2 is a diagram to show another example of an assumption related to the measurements of the FR1.

FIG. 1 is a diagram to show an example of an assumption related to the measurements of the FR1. FIG. 2 is a diagram to show another example of an assumption related to the measurements of the FR1. FIG. 1 corresponds to a case where the carriers to be measured are not synchronized, and FIG. 2 corresponds to a case where the carriers to be measured are synchronized.

In these figures, the SSBs to be measured are transmitted in the carriers to be measured (serving cell, neighbor cell 1, and neighbor cell 2), the SCS of each of the carriers=15 kHz, and one slot=1 ms. FIG. 1 corresponds to an SMTC window length=5 ms, and FIG. 2 corresponds to an SMTC window length=4 ms.

Each slot may include a plurality of (in the figures, two) SSB candidate resources. With a structure in which the SSBs are transmitted in the latter half of the slot as in the present example, a demodulation reference signal (DMRS) for data can be allocated in the former half of the slot. This is suitable in view of a reduction in delay in data decoding. The structure of the slots, the number of SSBs, and so on are not limited to the present example.

In a case where the carriers to be measured are not synchronized as in FIG. 1, an arbitrary period (for example, symbols) within the SMTC window period may be utilized for SSB measurements, and thus the UE is disabled from transmitting and/or receiving the data and control channel in the serving cell during the SMTC window period.

On the other hand, in a case where the carriers to be measured are synchronized as in FIG. 2, the UE is disabled from transmitting and/or receiving the data and control channel in at least one carrier on symbols including the symbols for the SSBs to be measured but can transmit and/or receive the data and control channel on the other symbols, within the SMTC window period.

For example, for a case where the UE performs the measurements of the FR2 are performed, the following assumption may be made.

(a) A UE not capable of performing fast receive beam switching fails to perform the data transmission and/or reception on the symbols of the SSBs to be measured (the symbols on which the data transmission and/or reception is disabled may include the X symbols preceding and/or succeeding the respective SSB symbols), (b) A UE capable of performing fast receive beam switching (fast RX beam switching) fails to perform the data transmission and/or reception on the symbols for the SSBs to be measured.

(c) In a case where RSRQ measurement is indicated, the data transmission and/or reception is disabled on RSSI measurement symbols as well as on the SSB symbols in (a) or (b).

X in (a) described above may be determined, based on the SCS. For example, for SCS<60 kHz, X=0 may be determined, for 60 kHz SCS<120 kHz, X=1 may be determined, and for 120 kHz SCS, X=2 may be determined.

Figure 3:
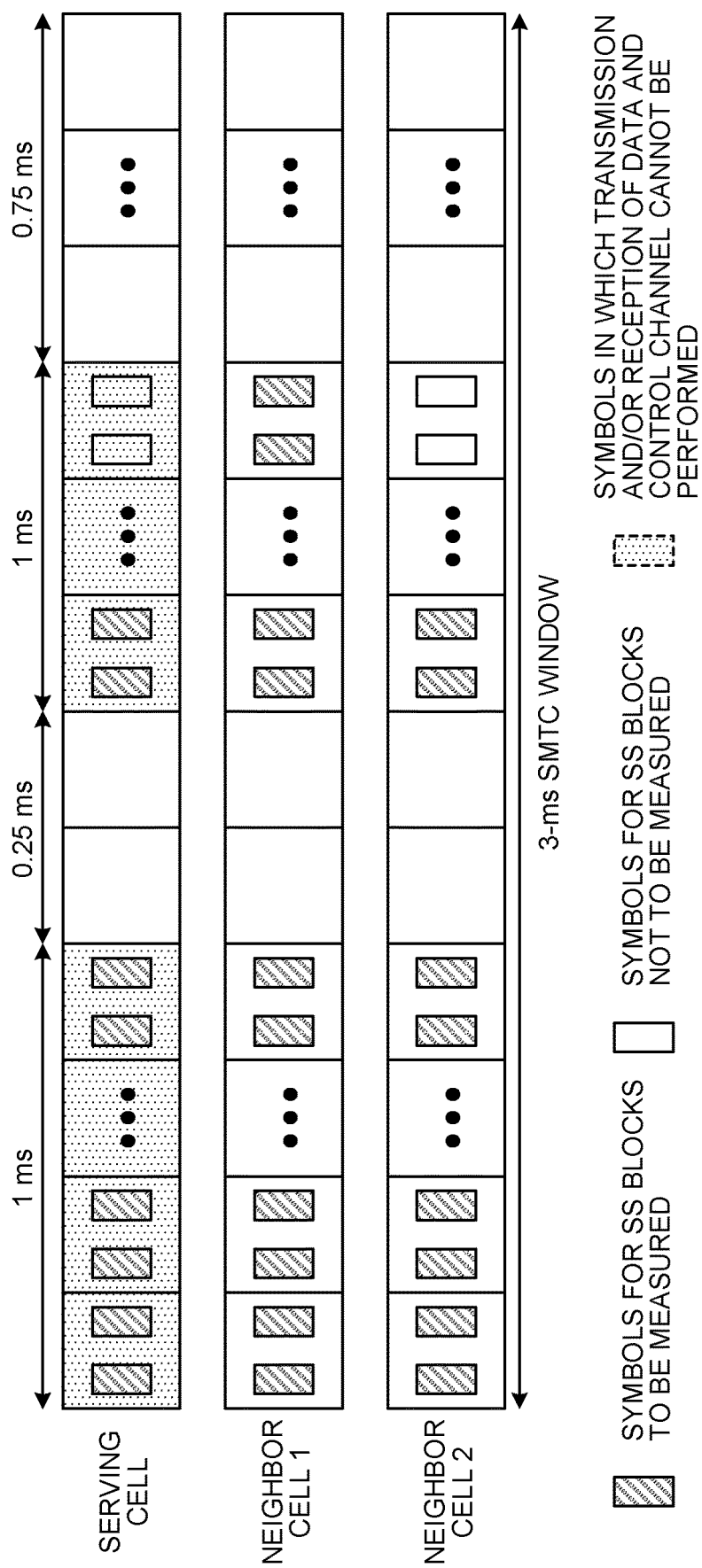
FIG. 3 is a diagram to show an example of an assumption related to measurements of an FR2.
Figure 4:
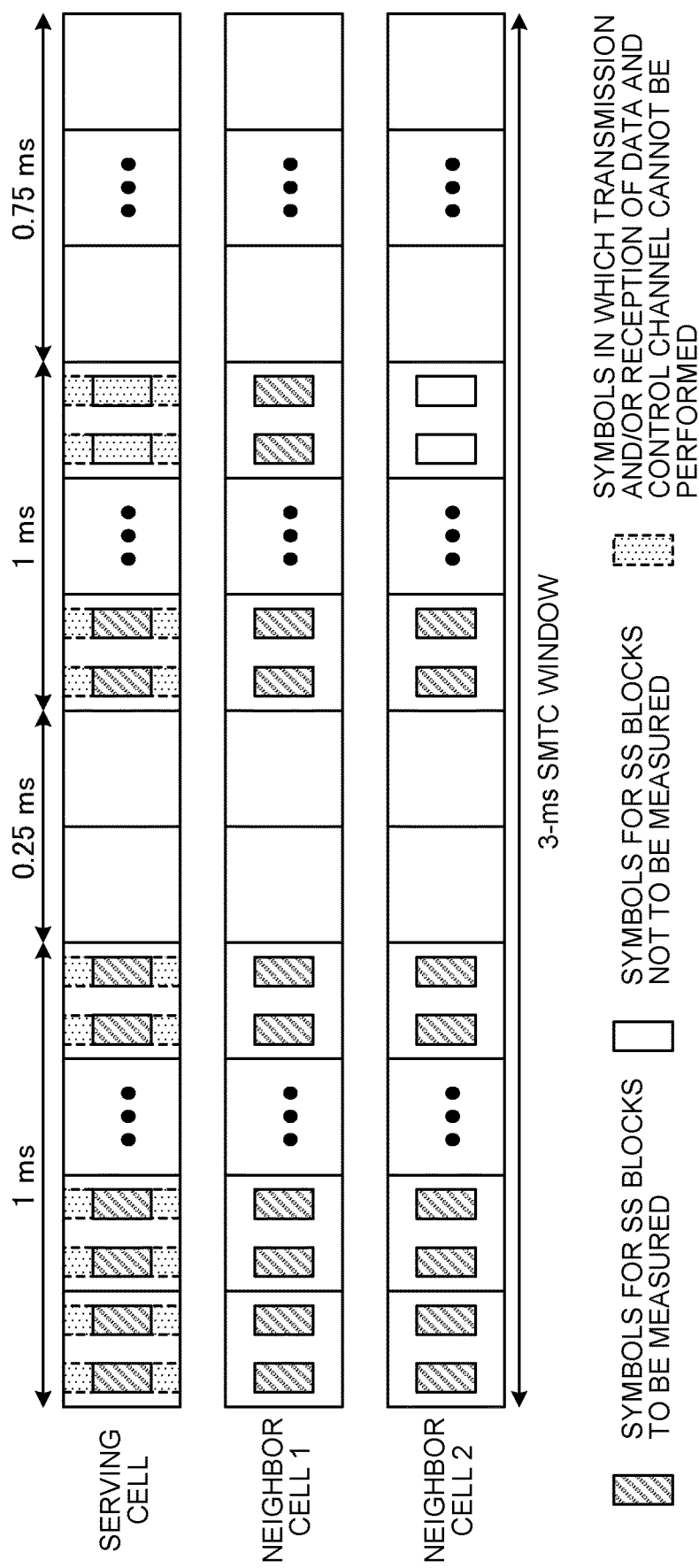
FIG. 4 is a diagram to show another example of an assumption related to the measurements of the FR2.

FIG. 3 is a diagram to show an example of an assumption related to the measurements of the FR2. FIG. 4 is a diagram to show another example of an assumption related to the measurements of the FR2. FIG. 3 corresponds to a case where the UE is not capable of performing fast receive beam switching, and FIG. 4 corresponds to a case where the UE can perform fast receive beam switching.

In these figures, the SSBs to be measured are transmitted in the carriers to be measured (serving cell, neighbor cell 1, and neighbor cell 2), the SCS of each of the carriers=120 kHz, and one slot=0.125 ms. Both FIG. 3 and FIG. 4 illustrate an example that corresponds to an SMTC window length=3 ms (24 slots) and in which the SSBs are transmitted in a total of 16 slots including the first to eighth slots and the tenth to seventeenth slots among the slots, whereas no SSBs are transmitted in the other slots.

Each slot may include a plurality of (in the figures, two) SSB candidate resources, and the SSBs may be transmitted using a plurality of SSB candidate resources in the slot as in the present example. The structure of the slots, the number of SSBs, and so on are not limited to the present example.

In a case where the UE is not capable of performing fast receive beam switching as in FIG. 3, the UE is disabled, within the SMTC window period, from transmitting and/or receiving the data and control channel in the serving cell, in at least one carrier on the symbols including the symbols for the SSBs to be measured and the X symbols preceding and succeeding the respective symbols for the SSBs to be measured.

Note that, FIG. 3 illustrates an example that, with the X symbols preceding and succeeding the respective SSBs taken into account, the data transmission and/or reception is disabled substantially over the SMTC window but that a person skilled in the art can appreciate that, even in a case where the UE is not capable of performing fast receive beam switching, the UE can perform, in some cases, the data transmission and/or reception within the SMTC window period.

On the other hand, in a case where the UE is capable of performing fast receive beam switching as in FIG. 4, the UE is disabled, within the SMTC window period, from transmitting and/or receiving the data and control channel in the serving cell, in at least one carrier on the symbols including the symbols for the SSBs to be measured but can transmit and/or receive the data and control channel in the serving cell on the other symbols.

As described above using these examples, the UE is preferably disabled from transmitting and/or receiving the data only at the timings when the UE really perform the measurements. For example, the following are also under study: SMTC-based control in which it is assumed that no data transmission and/or reception is allowed to be performed within the SMTC window, and MG-based control in which the measurements are performed at the timings of MGs when the data transmission and/or reception is of course disabled.

In a case where timings within the SMTC window overlap among a plurality of carriers, simultaneously measuring these carriers is difficult. This is because the UE often includes only one or two functional sections for the measurements. Thus, the measurement ratio of the carriers in the same-frequency measurements may be configured for the UE by the higher layer signaling or the like. The ratio between the same-frequency measurements and the different-frequency measurements may be configured for the UE by the higher layer signaling or the like.

Figure 5:
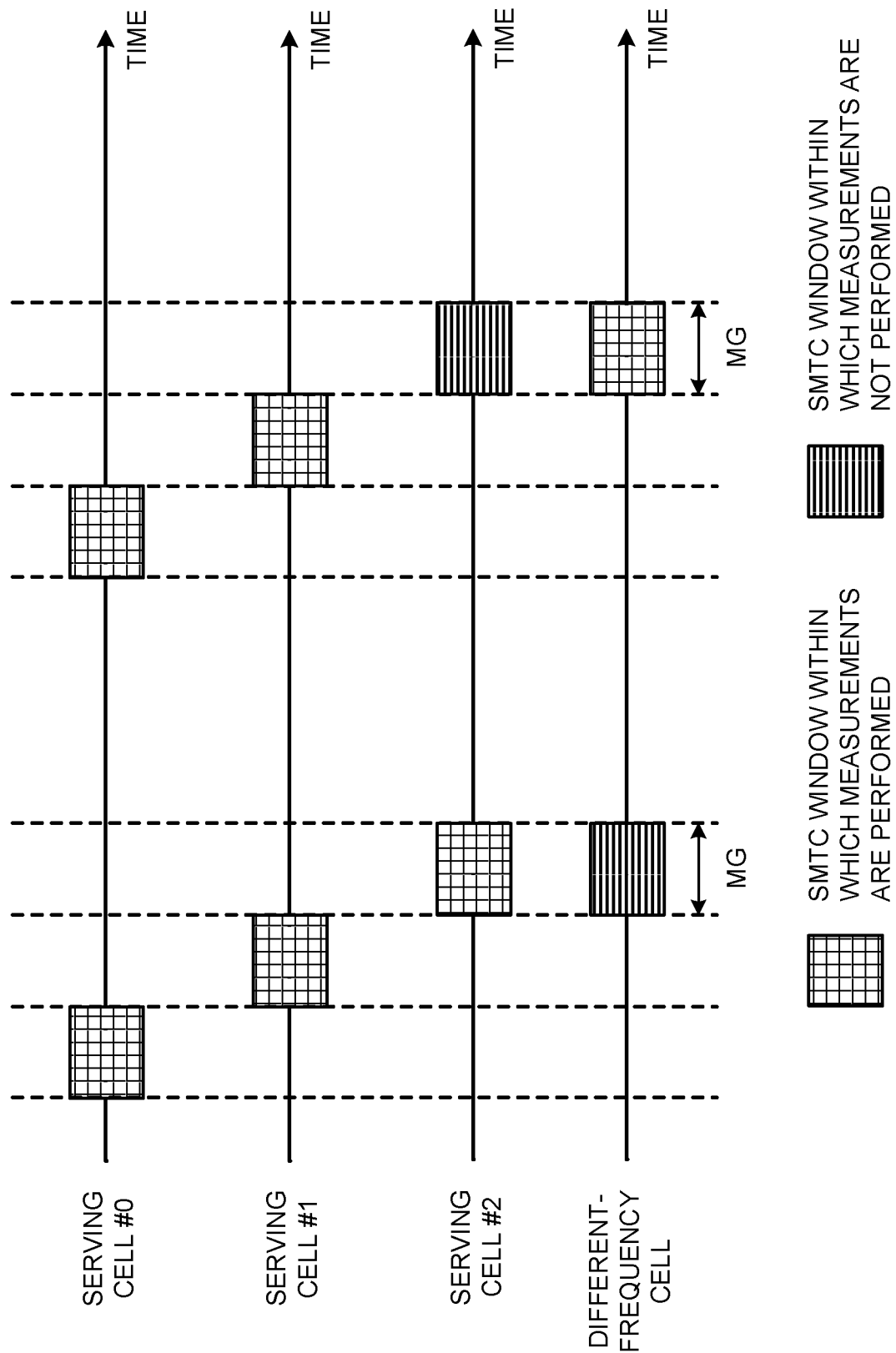
FIG. 5 is a diagram to show an example of a measurement process in a case where SMTC windows for a plurality of carriers overlap.
Figure 6:
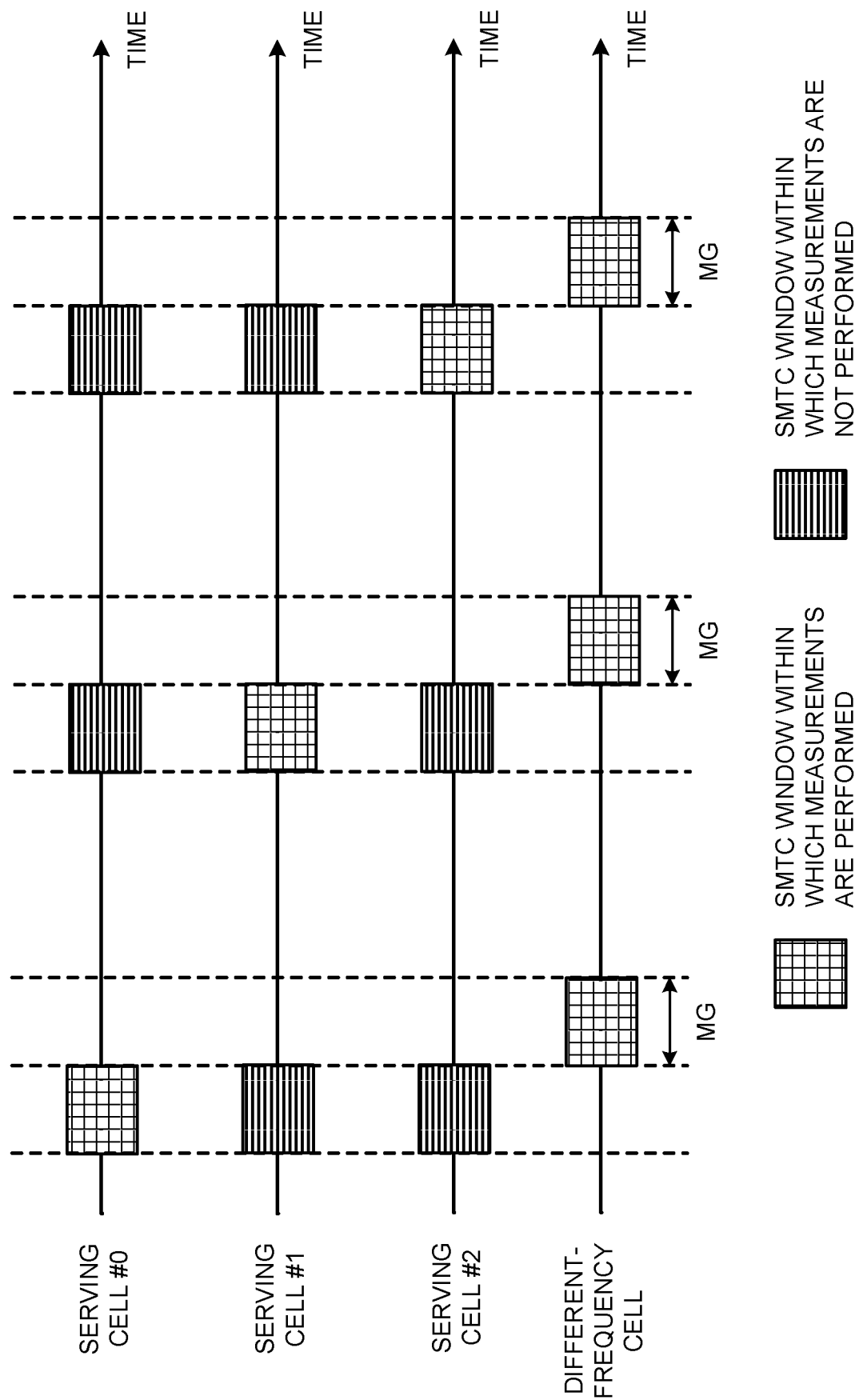
FIG. 6 is a diagram to show another example of the measurement process in the case where SMTC windows for a plurality of carriers overlap each other.

FIG. 5 is a diagram to show an example of a measurement process in a case where SMTC windows for a plurality of carriers overlap each other. FIG. 6 is a diagram to show another example of the measurement process in the case where SMTC windows for a plurality of carriers overlap each other.

In these figures, serving cells #0 to #2 correspond to the same frequency, the UE performs the intra-frequency measurements at SMTC window timings configured for the respective cells and performs the different-frequency measurements at separately configured SMTC window timings. The number of carriers that can be simultaneously measured is assumed to be 1, but the contents of the present disclosure are not limited to this.

In FIG. 5, the SMTC windows for the serving cells do not overlap each other. On the other hand, the SMTC window for serving cell #2 overlaps the MG and thus overlaps an SMTC window for a different-frequency cell. In the present example, a ratio of the same-frequency measurements and the different-frequency measurements is configured to be equal (the ratio is 50% or 1:1), and thus in the overlapping SMTC windows, the measurements of serving cell #2 and the different-frequency measurements are performed in 1:1.

In FIG. 6, the SMTC windows for the serving cells overlap each other. On the other hand, for none of the serving cells, the SMTC window does not overlap the MG nor the SMTC window for the different-frequency cell. In the present example, ratios of the measurements of the serving cells are configured to be equal (the ratios are 100%/the number of cells or 1:1:1), and thus in the overlapping SMTC windows, the measurements of serving cells #0 to #2 are performed in 1:1:1.

The present inventors of the present invention have studied a case where the measurements of the SSBs are performed in the plurality of serving cells as described above. The present inventors have found that uniform judgment of whether the data transmission and/or reception within the SMTC window is enabled or disabled disadvantageously leads to an excessive limitation on resources available for the data transmission and/or reception or a failure to achieve the appropriate measurements.

Figure 7:
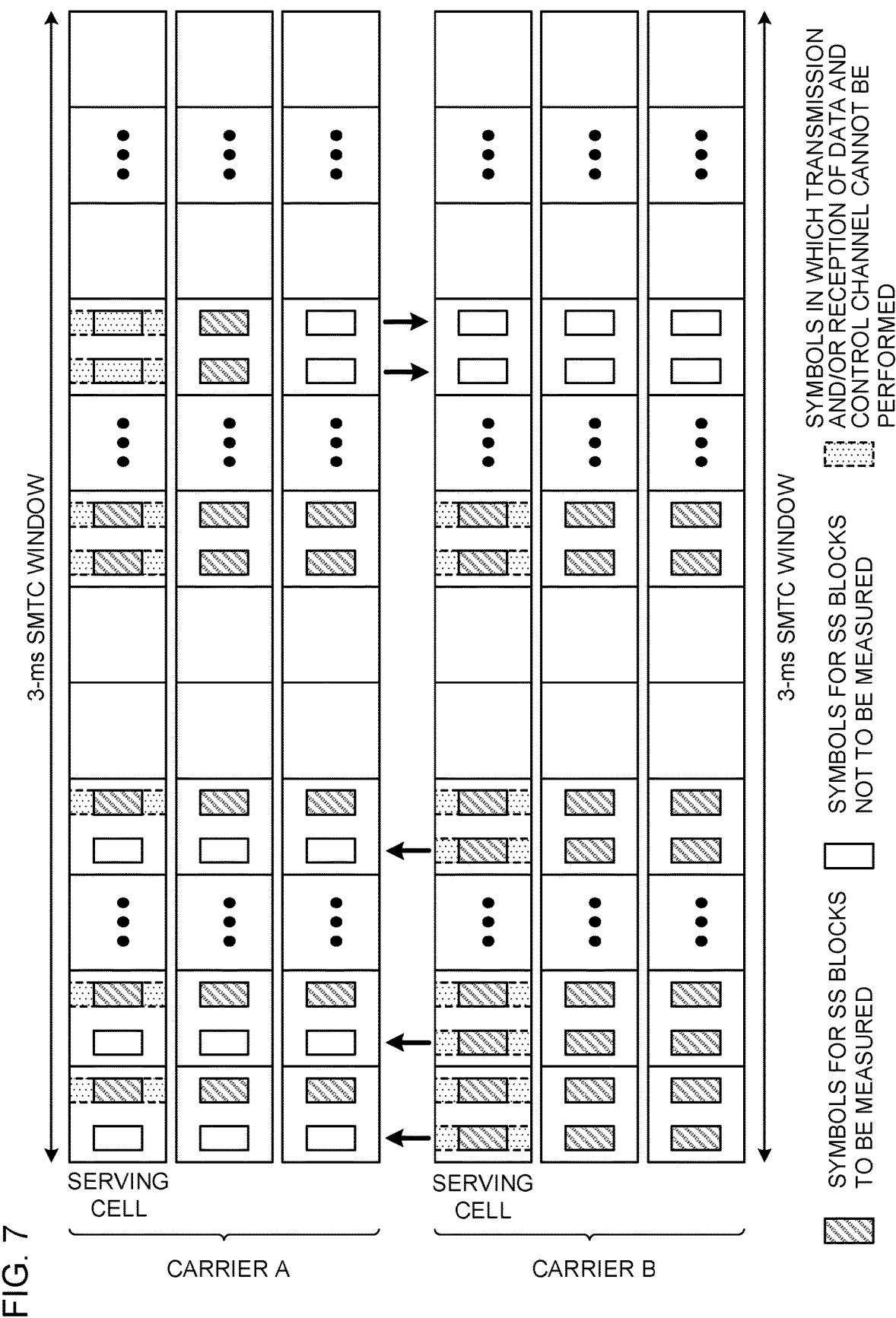
FIG. 7 is a diagram to show an example of a limitation on data transmission and/or reception in the case where SMTC windows for a plurality of carriers overlap each other.

FIG. 7 is a diagram to show an example of a limitation on the data transmission and/or reception in the case where SMTC windows for a plurality of carriers overlap each other. In the present example, carriers A and B are used with carrier aggregation (CA). Note that CA may be interpreted as another term, for example, may be interpreted as dual connectivity (DC).

The UE fails to perform, in each carrier, the data transmission and/or reception on the symbols of the SSBs to be measured. In the serving cell for each carrier, symbols are illustrated that correspond to a case where only this carrier is taken into account and on which the data transmission and/or reception is disabled.

However, in a certain case where, for example, the UE employs analog BF, directing the beam toward a carrier B (for example, when the carrier B is being measured), utilization of a carrier A is disabled.

In this case, for the symbols on which the data transmission and/or reception in one of the carriers A and B disabled, the data transmission and/or reception in the other carrier is also considered to be disabled. Arrows illustrated in the figure indicate that, for the symbols on which the data transmission and/or reception in one carrier disabled, the data transmission and/or reception in the other carrier also needs to be disabled.

The present inventors have found that, also in a case where the SMTC window timings are misaligned, for the symbols on which the data transmission and/or reception in one carrier disabled, the data transmission and/or reception in the other carrier may also need to be disabled. For example, such a case includes a case that, when analog BF is used for reception, a UE not capable of simultaneously processing different SCSs uses a measuring functional section for a plurality of carriers.

Thus, the present inventors have conceived a UE operation for allowing the measurements to be appropriately performed while maximizing resources available for the data transmission and/or reception even in a case where the measurements of the SSBs are performed in a plurality of serving cells.

Hereinafter, embodiments according to the present disclosure will be described in detail with reference to the drawings. Radio communication methods according to the embodiments may be applied independently or may be combined for application.

Radio Communication Method

In one embodiment, the UE and/or the base station judges a data transmitting/receiving operation of the UE in a given serving cell (carrier), based on measurement timing information (for example, SMTC and SSB indices) related to the given serving cell and measurement timing information related to the other serving cells.

The UE and/or the base station may judge (determine) the data transmitting/receiving operation of the UE in the given serving cell by taking into account at least one of the following:

(1) whether or not the SMTC timings in the carriers overlap each other, (2) whether or not the carriers are synchronized with each other, (3) whether or not the carriers belong to the same frequency range (for example, within the FR1 or within the FR2), (4) which of the SSBs in each carrier is to be measured (SSB indices), and (5) UE capability information regarding whether a measuring operation in a specific carrier limits the transmitting/receiving operation in a serving cell in the specific carrier or in the other carriers.

Note that, in a case where the SMTC window timings in a given serving cell overlap some of the SMTC window timings in the other serving carriers, the UE and/or the base station may assume that the data transmitting/receiving operation in the serving cell is switched between the overlapping portions and the non-overlapping portions.

The UE and/or the base station may judge that the data transmission and/or reception is constantly disabled during the MG period.

Figure 8:
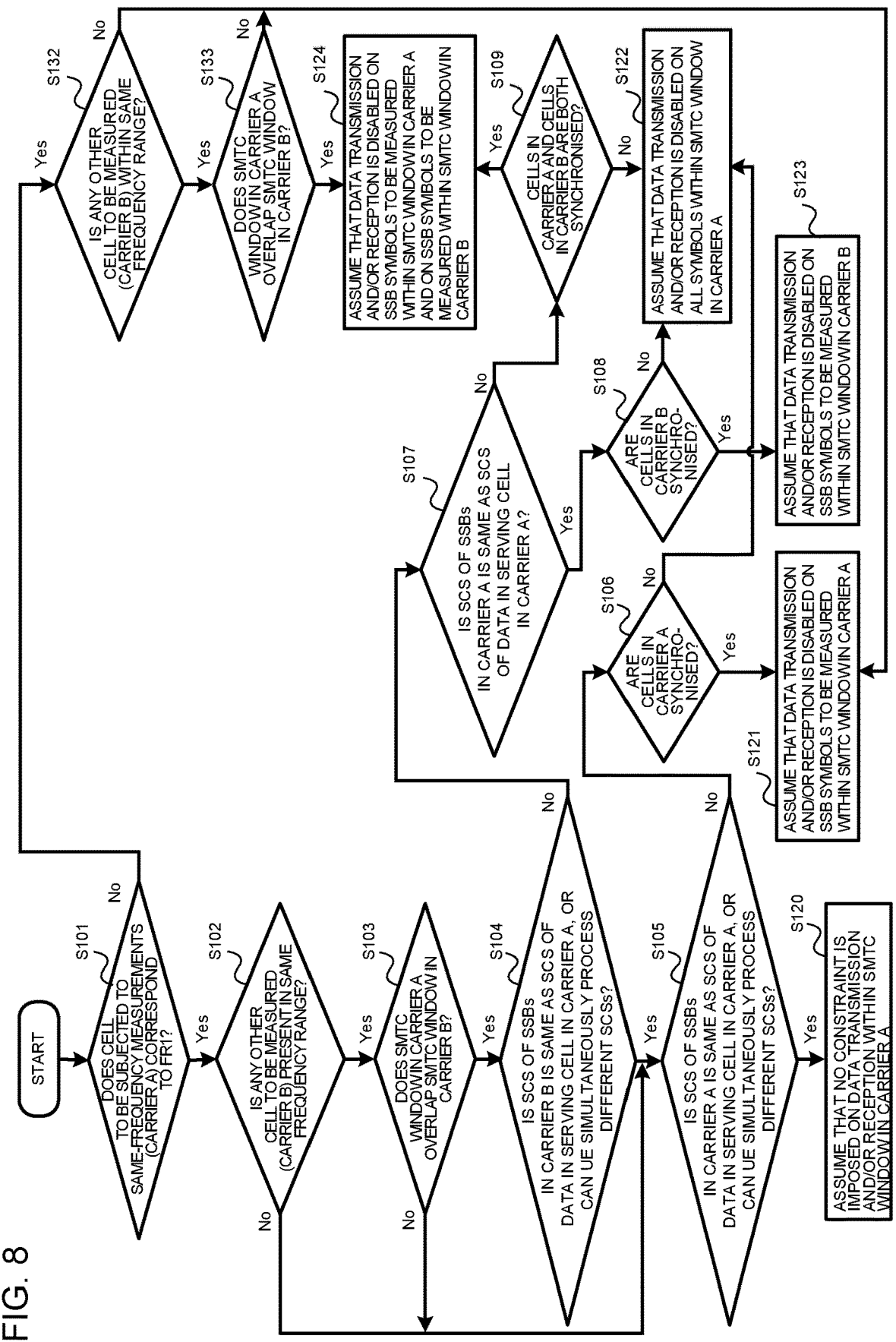
FIG. 8 is a diagram to show an example of a data transmitting/receiving operation determination flow according to one embodiment.

FIG. 8 is a diagram to show an example of a data transmitting/receiving operation determination flow according to one embodiment. The flow in FIG. 8 is a flow for judging, during a measurement timing (SMTC window) in a given serving cell for a carrier A, how the data transmission and/or reception in the given serving cell in the carrier A is constrained (limited), based on the measurement timings in another carrier B.

In the present example, the carrier A including a cell to be measured, based on the SMTC is configured at least in the UE. In a case where the carrier B is configured in the UE, the carrier B also includes the cell to be measured, based on the SMTC, and the UE is configured to perform CA by using the carriers A and B.

Serving cells subjected to CA are assumed to be synchronized with each other. It is assumed that the FR2 uses TDD and that the cells within the FR2 are assumed to be synchronized with each other. It is assumed that, within the FR2, analog BF is shared by a plurality of carriers. Note that these configurations, assumptions, and the like are intended to simplify illustration of the flow and do not limit the invention according to the present disclosure.

The subject of operation in FIG. 8 may be the UE or the base station. In the description below, the subject of operation is the UE.

The UE judges whether or not the cell to be subjected to the same-frequency measurements (carrier A) corresponds to the FR1 (step S101).

In a case where the cell to be subjected to the same-frequency measurements corresponds to the FR1 (step S101—Yes), the UE judges whether or not any other cell to be measured is present in the same frequency range (carrier B) (step S102).

In a case where the carrier B is present (step S102—Yes), the UE judges whether or not the SMTC windows (measurement timings) for the carriers A and B even partially temporally overlap (step S103).

In a case where the SMTC windows in the carriers A and B overlap each other (step S103—Yes), the UE judges whether the SCS of the SSBs in the carrier B (SCS for the SSBs) is the same as the SCS of the data in the serving cell in the carrier A (SCS for the data) and/or whether or not the UE can simultaneously process different SCSs (step S104).

In a case where the SCS of the SSBs in the carrier B is the same as the SCS of the data in the serving cell in the carrier A or the UE can simultaneously process different SCSs (step S104—Yes), the UE judges whether the SCS of the SSBs in the carrier A is the same as the SCS of the data in the serving cell in the carrier A and/or whether or not the UE can simultaneously process different SCSs (step S105).

In a case where the SCS of the SSBs in the carrier A is the same as the SCS of the data in the serving cell in the carrier A or the UE can simultaneously process different SCSs (step S105—Yes), the UE assumes that no constraint is imposed on the data transmission and/or reception within the SMTC window for the carrier A (step S120).

Such conditional branches are used because, in the case of step S105—Yes, even a UE failing to simultaneously process a plurality of different SCSs executes, on the measurements and the data in the carrier A, processing based on the same single SCS, and thus the appropriate handling can be achieved. Alternatively, in the case of step S105—Yes, the UE can simultaneously process a plurality of different SCSs, and thus the appropriate handling can be achieved even in a case where the measurements and the data in the carrier A need a process based on different SCS.

Note that, in a case where the carrier B is not present (step S102-No) or the SMTC windows in the carriers A and B do not overlap each other (step S103—No), no other carrier is measured within the SMTC window for the carrier A and that the steps ending with step S104 are omitted, with the process proceeding to step S105.

Note that, in a case where the UE is judged in step S104 to be capable of simultaneously processing different SCSs, step S105 may be omitted (the determination in step S105 is assumed to be Yes) and the process may proceed to step S120.

In a case where the SCS of the SSBs in the carrier A is different from the SCS of the data in the serving cell in the carrier A or the UE fails to simultaneously process different SCSs (step S105—No), the UE judges that the cells in the carrier A are synchronized (step S106). For example, in step S106, the UE judges whether or not the cell to be measured in the carrier A is synchronized with the other cells in the carrier A.

In a case where the cells in the carrier A are synchronized (step S106—Yes), the UE assumes that the data transmission and/or reception is disabled on the SSB symbols to be measured within the SMTC window for the carrier A (step S121).

In a case where the cells in the carrier A are not synchronized (step S106—No), the UE assumes that the data transmission and/or reception is disabled on all the symbols within the SMTC window for the carrier A (step S122).

In a case where the SCS of the SSBs in the carrier A is different from the SCS of the data in the serving cell in the carrier A or the UE fails to simultaneously process different SCSs (step S104—No), the UE judges whether or not the SCS of the SSBs in the carrier A is the same as the SCS of the data in the serving cell in the carrier A (step S107).

In a case where the SCS of the SSBs in the carrier A is the same as the SCS of the data in the serving cell for the carrier A (step S107—Yes), the UE judges whether or not the cells in the carrier B are synchronized (step S108). For example, in step S108, the UE judges whether or not the cell to be measured in the carrier B is synchronized with the other cells in the carrier B.

In a case where the cells in the carrier B are synchronized (step S108—Yes), the UE assumes that the data transmission and/or reception in the serving cell in the carrier A is disabled on the SSB symbols to be measured within the SMTC window for the carrier B (step S123).

Such conditional branches are used because, in the case of step S108—Yes, even though the UE fails to simultaneously process a plurality of different SCSs, the measurements of the carrier B and the data in the carrier A need a process based on different SCSs.

In a case where the cells in the carrier B are not synchronized (step S108—No), the UE assumes that the data transmission and/or reception is disabled on all the symbols within the SMTC window for the carrier A (step S122).

In a case where the SCS of the SSBs in the carrier A is different from the SCS of the data in the serving cell for the carrier A (step S107—No), the UE judges whether or not the cells in the carrier A and in the carrier B are both synchronized (step S109). For example, in step S109, the UE judges whether or not the cell to be measured in the carrier A is synchronized with the other cells in the carrier A and whether or not the cell to be measured in the carrier B is synchronized with the other cells in the carrier B.

In a case where the cells in the carrier A and in the carrier B are both synchronized (step S109—Yes), the UE assumes that the data transmission and/or reception is disabled on the SSB symbols to be measured within the SMTC window for the carrier A and on the SSB symbols to be measured within the SMTC window for the carrier B (step S124). This assumption can be said to include both the assumption in S121 and the assumption in S123.

Such conditional branches are used because, in the case of step S109—Yes, even though the UE fails to simultaneously process a plurality of different SCSs, the data in the carrier A needs a process based on an SCS different from the SCS for the measurements of the carrier A and the SCS for the measurements of the carrier B.

In a case where the cells in the carrier A are not synchronized (step S109—No), the UE assumes that the data transmission and/or reception is disabled on all the symbols within the SMTC window for the carrier A (step S122).

In a case where the cell to be subjected to the same frequency measurements does not correspond to the FR1 (for example, corresponds to the FR2) (step S101—No), the UE judges, as in the step S102, whether or not any other cell to be measured (carrier B) is present in the same frequency range (carrier B) (step S132).

In a case where the carrier B is present (step S132—Yes), the UE judges, as in the step S103, whether or not the SMTC windows (measurement timings) for the carriers A and B even partially temporally overlap each other (step S133).

In a case where the SMTC windows for the carriers A and B overlap each other (step S133—Yes), the UE assumes that the data transmission and/or reception is disabled on the SSB symbols to be measured within the SMTC window for the carrier A and on the SSB symbols to be measured within the SMTC window for the carrier B (step S124).

Such conditional branches are used because, in consideration of the assumption that, within the FR2, analog BF is shared by a plurality of carriers, the UE fails to perform the data transmission and/or reception in the carrier A while measuring any of the carriers in a case of step S133—Yes.

Note that, in a case where the carrier B is not present (step S132-No) or the SMTC windows in the carriers A and B do not overlap each other (step S133—No), no other carrier is measured within the SMTC window for the carrier A and that the UE assumes that the data transmission and/or reception is disabled on the SSB symbols to be measured within the SMTC window for the carrier A (step S121).

Such conditional branches are used because, in consideration of the assumption that the cells within the FR2 are synchronized, in the case of step S132—No or step S133—No, it is sufficient to assume that that the UE fails to perform the data transmission and/or reception for the carrier A only on the SSB symbols to be measured for the carrier A.

Switching of Assumption on Data Transmission and/or Reception Based on Overlapping SMTC Windows Note that, in connection with steps S103 and S133, the UE may assume, for portions (time) of the SMTC window for the carrier A overlapping the SMTC window for the carrier B, the results in steps S103 and S133 to be Yes to judge the data transmitting/receiving operation in the serving cell for the carrier A. For portions (time) of the SMTC window for the carrier A not overlapping the SMTC window for the carrier B, the UE may assume the results in steps S103 and S133 to be No to judge the data transmitting/receiving operation in the serving cell for the carrier A.

Figure 9:
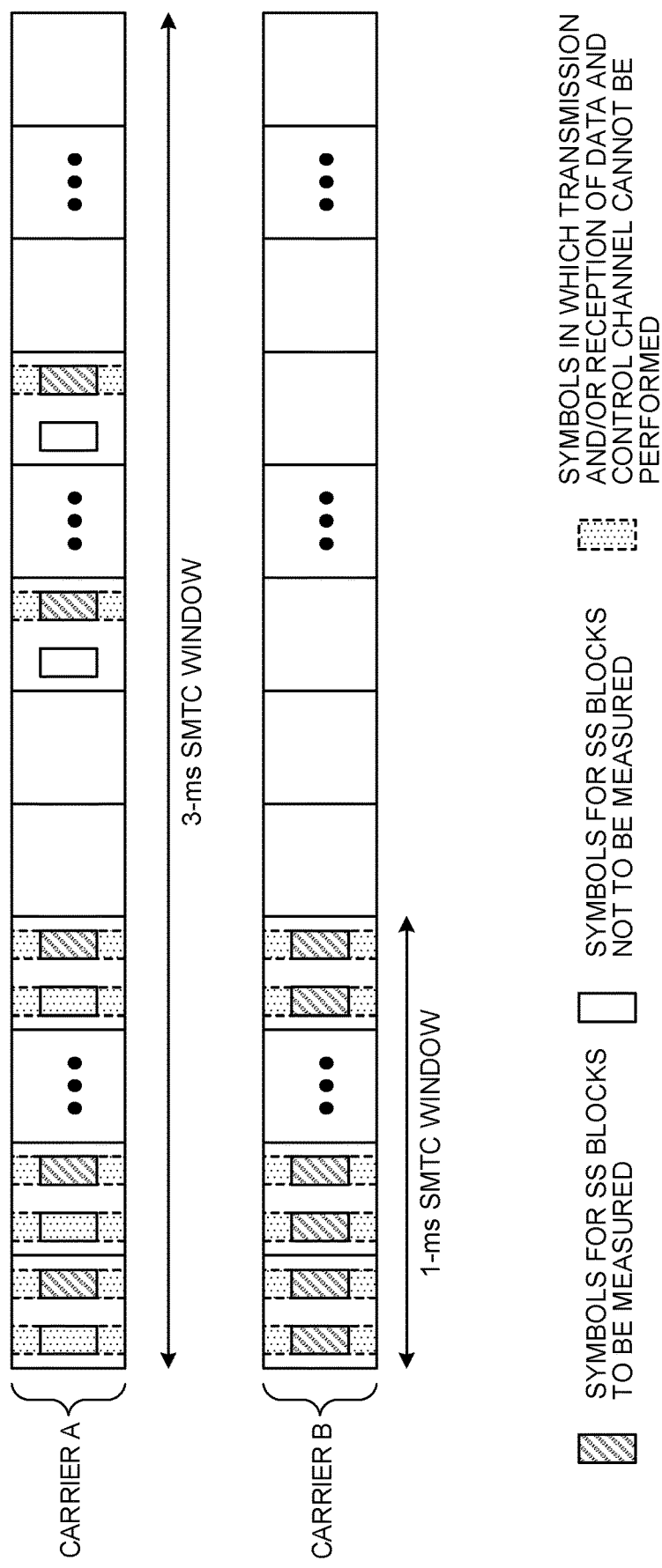
FIG. 9 is a diagram to show an example of control of switching a data transmitting/receiving operation depending on whether or not the SMTC windows overlap.

With reference to FIG. 9, control will be described in which a data transmitting/receiving operation is switched depending on whether or not the SMTC windows overlap.

FIG. 9 is a diagram to show an example of control of switching the data transmitting/receiving operation depending on whether or not the SMTC windows overlap. In the present example, the carriers A and B in the FR2 are subjected to CA.

For each carrier, SCS=120 kHz and one slot=0.125 ms. The SMTC window length for the carrier A is 3 ms (24 slots), and the SSBs are transmitted in a total of 16 slots including the first to eighth slots and the tenth to seventeenth slots within the window as is the case with FIG. 3, whereas no SSBs are transmitted in the other slots.

The SMTC window length for the carrier B is 1 ms (8 slots), and the SSBs are transmitted in each of the slots within the window. In other words, the SMTC window for the carrier B is shorter than the SMTC window for the carrier A. It is assumed that a start timing is the same for the SMTC window for each carrier.

Each slot includes a plurality of (in the figure, two) SSB candidate resources. For the carrier A, the latter SSBs are notified as measurement objects, and for the carrier B, all the SSBs are notified as measurement objects.

FIG. 9 shows data transmission and/or reception disabled symbols in the serving cell for the carrier A for which switching of the data transmitting/receiving operation is taken into account.

A 1-ms period from the start timing in the SMTC window for the carrier A corresponds to a case where the SMTC windows in the carriers A and B overlap (step S133—Yes), and thus, the UE executes a process based on step S124.

On the other hand, a period from 1 ms to 3 ms from the start timing corresponds to a case where the SMTC windows in the carriers A and B do not overlap each other (step S133—No), and thus, the UE executes a process based on step S121.

UE Capability Information

The UE may use the higher layer signaling or the like to notify the base station of the UE capability information indicating whether a measuring operation in a certain carrier affects a data transmitting/receiving operation in the serving cell for the carrier and/or any other carrier, and vice versa. The UE capability information may be information for each CA band combination or may be band agnostic information or may be information common to the bands.

For example, the UE capability information may include information indicating whether or not analog BF is shared by specific bands in a given carrier (FR2 or the like). Use of this information allows, in the case of inter-band CA, the base station to suitably judge whether the intra-frequency measurements in one of the carriers affect the data transmitting/receiving operation in the other carrier due to the constraint of analog BF.

The UE capability information may include information indicating whether the measuring functional section of the UE is shared among the serving cells or used independently. A UE including a shared measuring functional section and failing to simultaneously process different SCSs is disabled, while applying the SCS of the SSBs to be measured, from performing the data transmission and/or reception in the serving cell using another SCS. Use of the above-described information allows the base station to suitably judge the operation of the UE.

The above-described UE capability information may include information indicating whether the UE has the capability of handling digital BF. The UE and/or the base station may assume that the data transmission and/or reception is constrained as described above in a case where the UE does not have the capability of handling digital BF.

The UE and/or the base station may judge, based on the UE capability information, whether the data transmission/reception operation in a given carrier is enabled or disabled. Note that the UE and/or the base station may assume that the UE can simultaneously process the SSBs and the data with different SCSs as long as the UE can apply CA with different SCSs.

According to the above-described embodiment, even in a case where the measurements of the SSBs are performed in a plurality of serving cells, the measurements can be suitably performed by the UE, with resources available for the UE for the data transmission and/or reception maximized, based on the information such as the configured SMTC window.

Variations

In the above-described embodiment, the measurements using the MGs have been described. However, the method for judging whether the data transmission and/or reception is enabled or disabled according to the present disclosure may be similarly used for a case where other measurements are used. For example, even in a case of the different-frequency measurements (gapless measurements) using no MGs, data transmission and/or reception disabled timings as descried above may be assumed to occur in the SMTC window for the carrier to be measured, as is the case with CA.

In the above-described embodiment, it is assumed that, for example, in a case where the SMTC windows for the FR2 are misaligned, the data transmission and/or reception is disabled in all the serving cells within the FR2 during each window, leading to a degraded communication throughput. On the other hand, it is assumed that alignment of the SMTC windows within the FR2 disables simultaneous measurements of a plurality of carriers, leading to an extended measurement cycle for each carrier and that reporting of measurement results is thus delayed, making appropriate cell section difficult.

Thus, a configuration may be provided in which, in a given carrier (for example, the FR2), the intra-frequency measurements of some cells (SCells) are not performed during CA. For example, the UE may assume not to perform the intra-frequency measurements in serving cells for which no measurement object is configured by the NW.

The base station may use the higher layer signaling or the like to notify of information indicating that no intra-frequency measurements are performed in a specific carrier (serving cell). The information may be notified using an information element included in the RRC signaling and indicating the measurement object, an information element configured commonly to the serving cells ("ServiceCellConfigCommon" IE), or the like.

The UE may derive the number of a plurality of carriers simultaneously measured according to the number of measuring functional sections provided in the UE. The UE may report, to the base station, information related to the number of the measuring functional sections and/or the number of simultaneous measurements, in the UE capability information. Based on the UE capability information, the base station may configure, for the UE, the limitation on the intra-frequency measurements as described above.

Note that, in the flowchart in FIG. 8, the UE judges, in step S101, whether the target cell of the same-frequency measurements (carrier A) corresponds to the FR1 but that the FR1 may be another frequency range (or another frequency band).

In the flowchart in FIG. 8, the UE judges, in step S102 and so on, whether any other cell to be measured (carrier B) is present within the same frequency range but that the carrier B may be present within a different frequency range. In this case, the UE can preferably perform gapless different-frequency measurements.

In the flowchart in FIG. 8, the UE judges, based on the SMTC timings in each carrier and so on, whether the data transmission and/or reception in the serving cell is enabled or disabled but no such limitation is intended. For example, by using the higher layer signaling or the like, the UE may be notified of information related to the control of the data transmission and/or reception in a specific serving cell for a given carrier. The UE may control the data transmission and/or reception in the serving cell, based on the information notified, regardless of the flow in FIG. 8.

The information related to the control of the data transmission and/or reception may be, for example, information indicating that the data transmission and/or reception in the specific serving cell for the given carrier is judged, based on at least one of steps S120 to S124. The information may be, for example, information indicating that no constraint is imposed on the data transmission and/or reception within the SMTC window for the given carrier.

In the present disclosure, the structure has been described in which one frequency range includes a plurality of carriers and in which one carrier includes a plurality of cells. The frequency range, the cell, the serving cell, the carrier, and the CC may be interpreted as one another.

Radio Communication System

Hereinafter, a structure of a radio communication system according to one embodiment of the present disclosure will be described. In this radio communication system, the radio communication method according to each embodiment of the present disclosure described above may be used alone or may be used in combination for communication.

Figure 10:
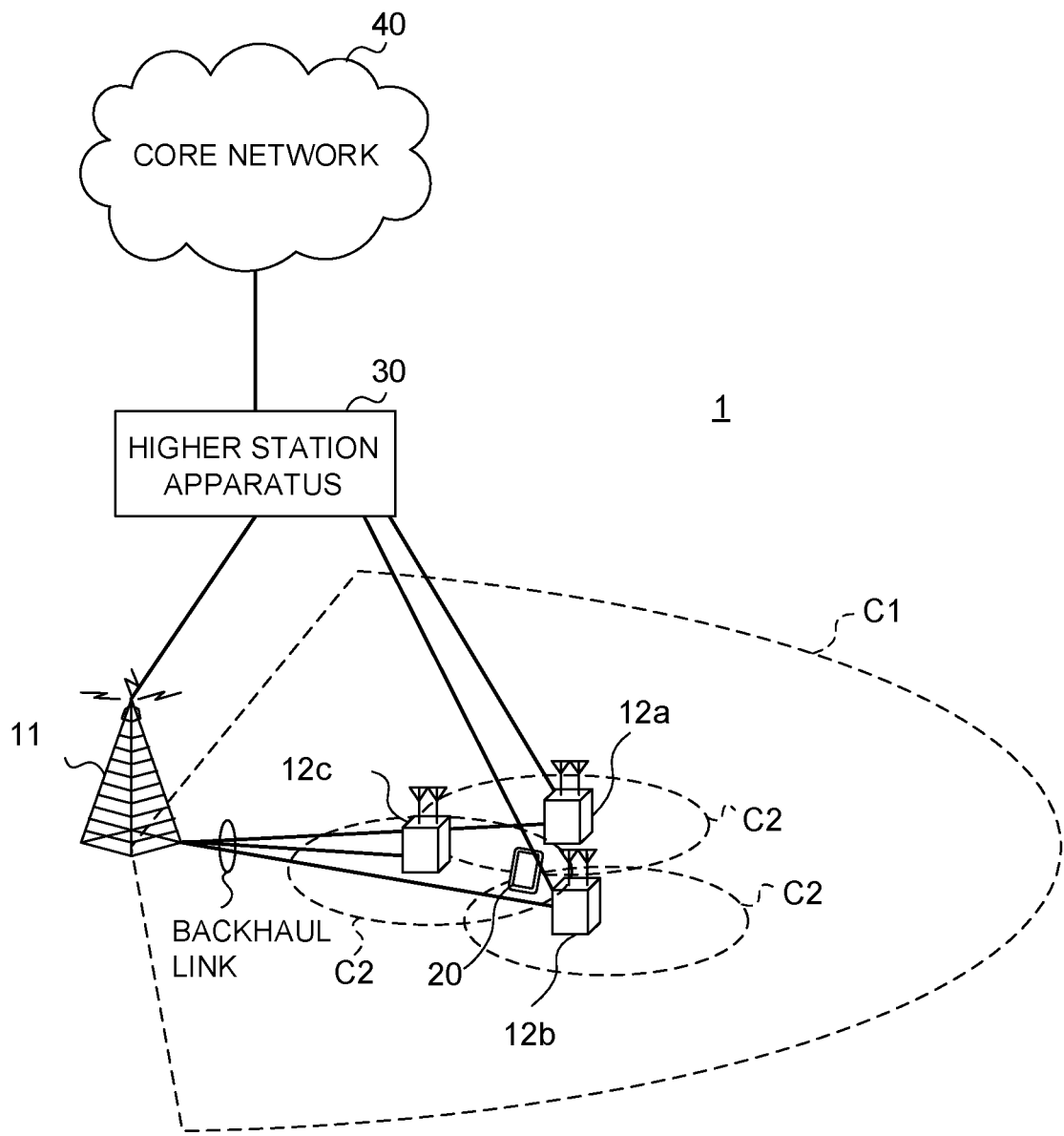
FIG. 10 is a diagram to show an example of a schematic structure of a radio communication system according to one embodiment.

FIG. 10 is a diagram to show an example of a schematic structure of the radio communication system according to one embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12*a* to 12*c*) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on. For example, if certain physical channels use different subcarrier spacings of the OFDM symbols constituted and/or different numbers of the OFDM symbols, it may be referred to as that the numerologies are different.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, SR (Scheduling Request), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

Radio Base Station

Figure 11:
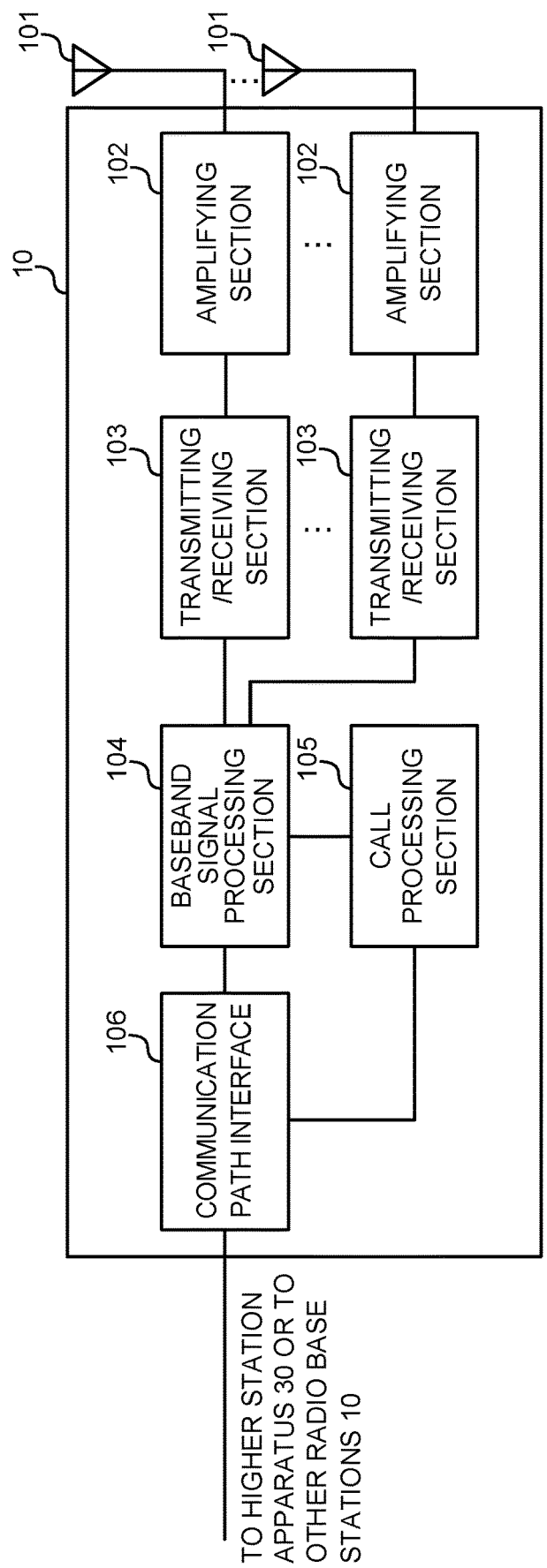
FIG. 11 is a diagram to show an example of an overall structure of a radio base station according to one embodiment.

FIG. 11 is a diagram to show an example of an overall structure of the radio base station according to one embodiment. A radio base station 10 includes a plurality of transmitting/receiving antennas 101, amplifying sections 102, transmitting/receiving sections 103, a baseband signal processing section 104, a call processing section 105 and a communication path interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the radio base station 10, manages the radio resources and so on.

The communication path interface 106 transmits and/or receives signals to and/or from the higher station apparatus 30 via a given interface. The communication path interface 106 may transmit and/or receive signals (backhaul signaling) with other radio base stations 10 via an inter-base station interface (for example, an optical fiber in compliance with the CPRI (Common Public Radio Interface) and an X2 interface).

Note that the transmitting/receiving section 103 may further include an analog beam forming section that performs analog beam forming. The analog beam forming section may be constituted of an analog beam forming circuit (for example, a phase shifter or a phase shift circuit) or an analog beam forming apparatus (for example, a phase shifter) described based on general understanding of the technical field to which the present invention pertains. The transmitting/receiving antenna 101 may be constituted of, for example, an array antenna.

The transmitting/receiving section 103 transmits and/or receives data in a cell included in a carrier configured with the SMTC. The transmitting/receiving section 103 may transmit, to the user terminal 20, information related to the same-frequency measurements and/or different-frequency measurements and so on.

Figure 12:
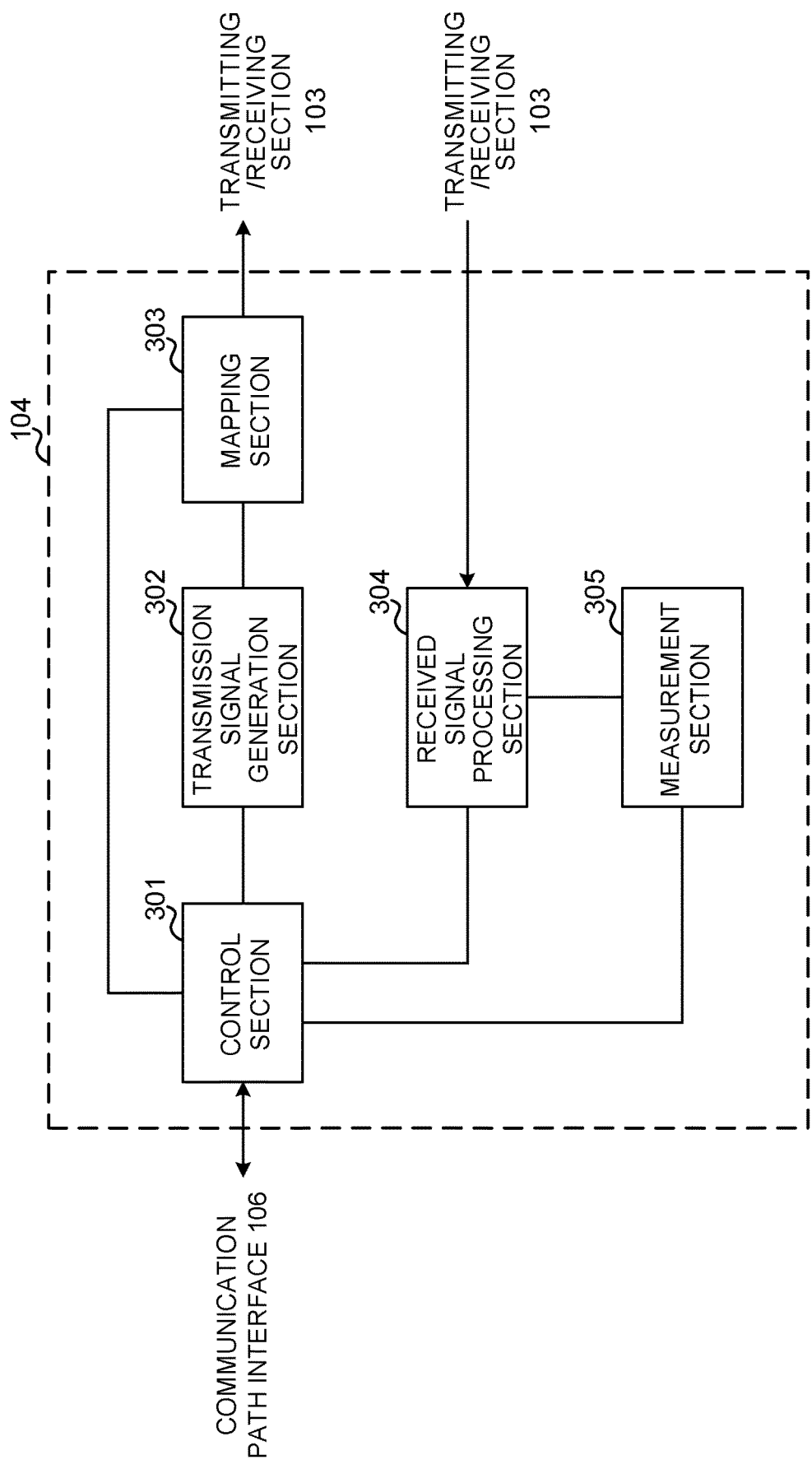
FIG. 12 is a diagram to show an example of a functional structure of the radio base station according to one embodiment.

FIG. 12 is a diagram to show an example of a functional structure of the radio base station according to one embodiment of the present disclosure. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH. Transmission confirmation information, and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls the scheduling of an uplink data signal (for example, a signal transmitted on the PUSCH), an uplink control signal (for example, a signal transmitted on the PUCCH and/or the PUSCH. Transmission confirmation information, and so on), a random access preamble (for example, a signal transmitted on the PRACH), an uplink reference signal, and so on.

The control section 301 may perform control in which digital BF in the baseband signal processing section 104 (for example, precoding) and/or analog BF in the transmitting/receiving section 103 (for example, phase rotation) is used to form a transmit beam and/or a receive beam. The control section 301 may perform control in which beams are formed based on downlink channel information, uplink channel information, and so on. The channel information may be acquired from the received signal processing section 304 and/or the measurement section 305.

The control section 301 may judge, based on information for the measurements of the SSBs for the second carrier (for example, SMTC information), whether the data transmission to and/or reception from the user terminal 20 at a specific timing (for example, within the SMTC window) using the first carrier is enabled or disabled.

The control section 301 may judge whether the data transmission and/or reception using the first carrier is enabled or disabled, based on whether or not the timings for the measurements of the SSBs (for example, the SMTC window) overlap between the first carrier and the second carrier.

The control section 301 may judge whether the data transmission and/or reception using the first carrier is enabled or disabled, based on whether or not the cells included in the first carrier and/or the cells included in the second carrier are synchronized with each other.

The control section 301 may judge whether the data transmission and/or reception using the first carrier is enabled or disabled, based on whether or not the first carrier and the second carrier belong to the same frequency range.

The control section 301 may judge whether the data transmission and/or reception using the first carrier is enabled or disabled, based on the capability information regarding whether or not the measuring operation for the SSBs in the second carrier and the data transmitting/receiving operation in the first carrier affect each other.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to given radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

User Terminal

Figure 13:
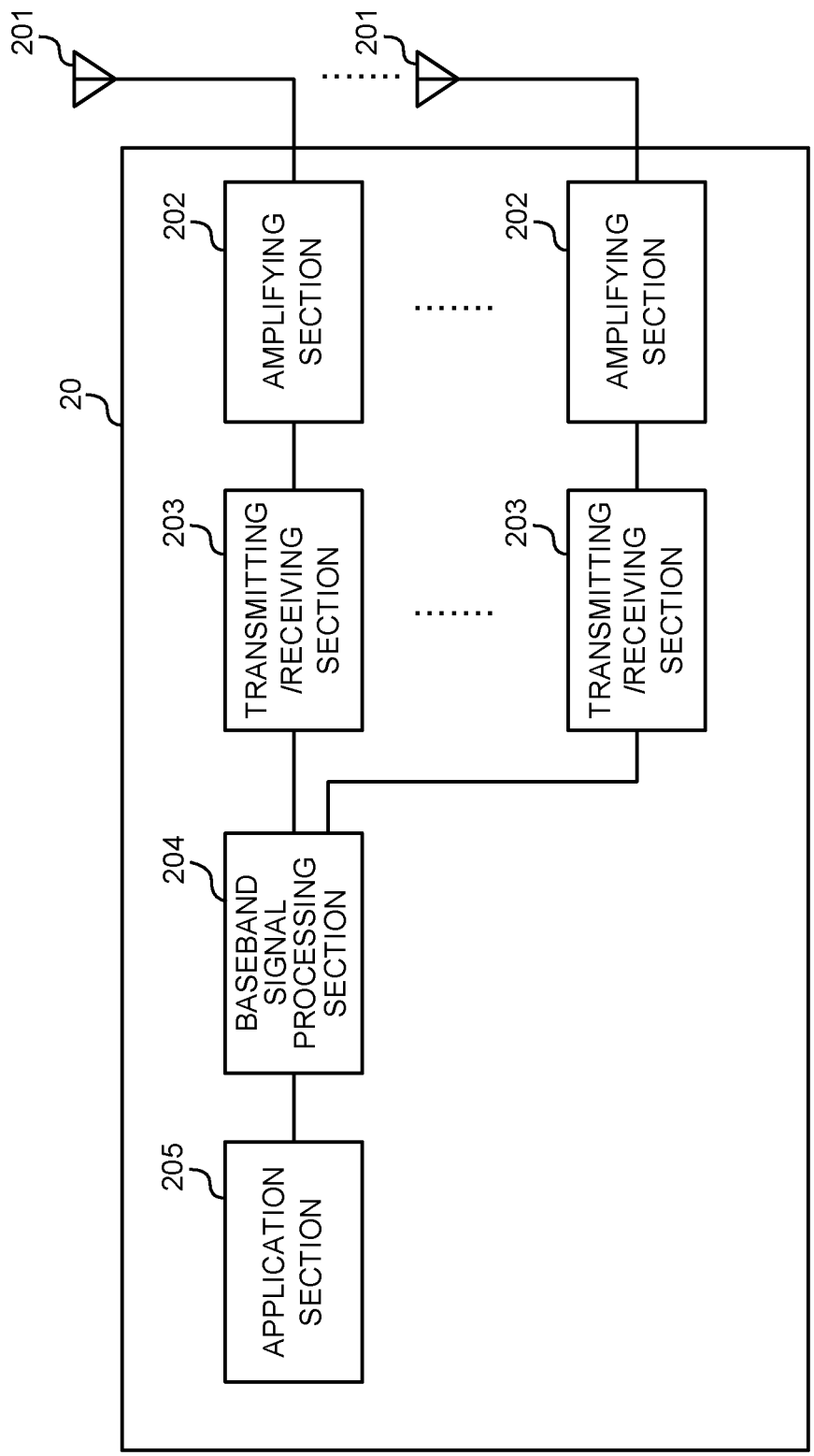
FIG. 13 is a diagram to show an example of an overall structure of a user terminal according to one embodiment.

FIG. 13 is a diagram to show an example of an overall structure of a user terminal according to one embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Note that the transmitting/receiving section 203 may further include an analog beam forming section that performs analog beam forming. The analog beam forming section may be constituted of an analog beam forming circuit (for example, a phase shifter or a phase shift circuit) or an analog beam forming apparatus (for example, a phase shifter) described based on general understanding of the technical field to which the present invention pertains. The transmitting/receiving antenna 201 may be constituted of, for example, an array antenna.

The transmitting/receiving section 203 transmits and/or receives data in a cell included in a carrier configured with the SMTC. The transmitting/receiving section 203 may receive, from the radio base station 10, information related to the same-frequency measurements and/or different-frequency measurements and so on.

Figure 14:
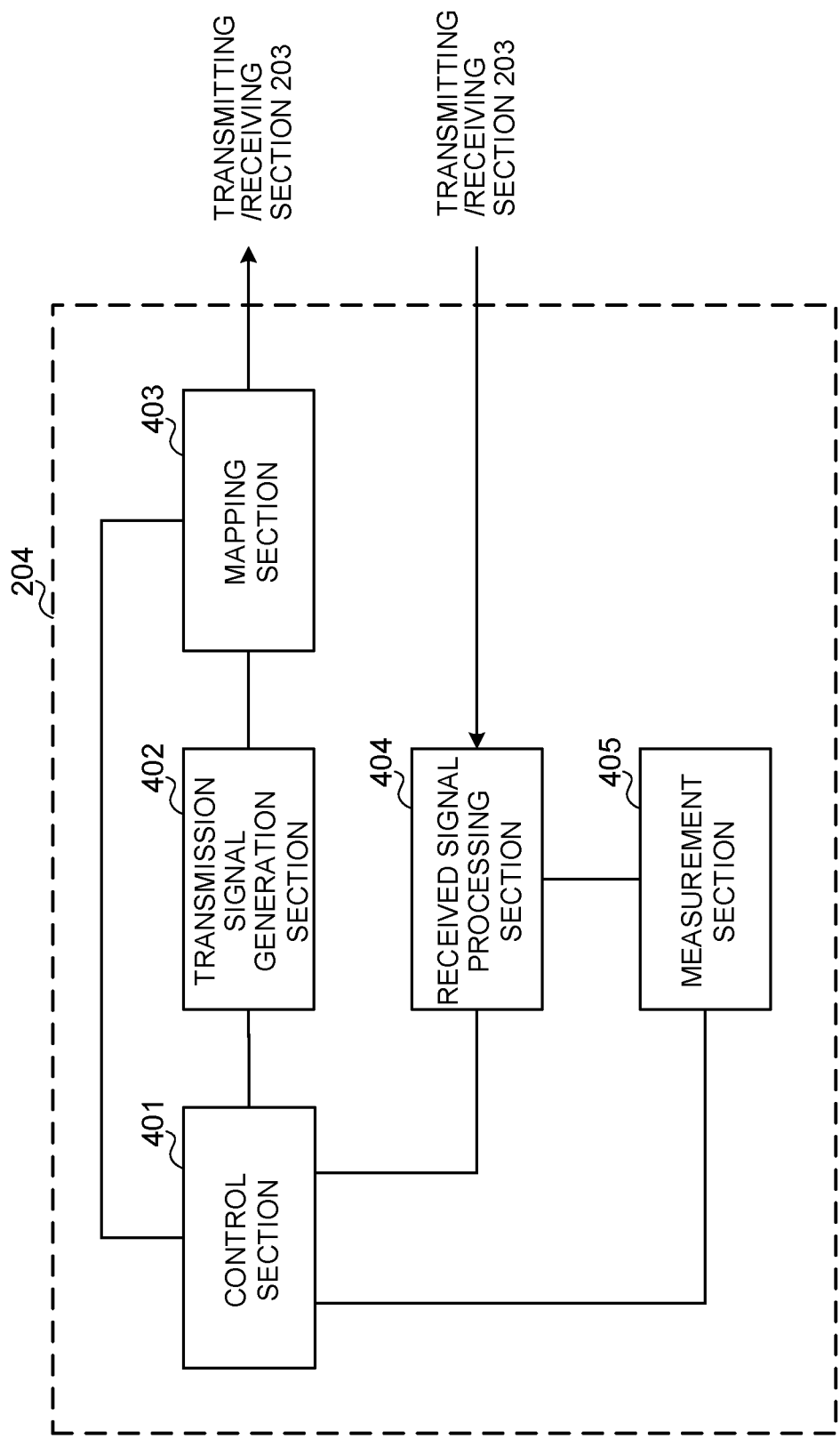
FIG. 14 is a diagram to show an example of a functional structure of the user terminal according to one embodiment.

FIG. 14 is a diagram to show an example of a functional structure of the user terminal according to one embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may perform control in which digital BF in the baseband signal processing section 204 (for example, precoding) and/or analog BF in the transmitting/receiving section 203 (for example, phase rotation) is used to form a transmit beam and/or a receive beam. The control section 401 may perform control in which beams are formed based on downlink channel information, uplink channel information, and so on. The channel information may be acquired from the received signal processing section 404 and/or the measurement section 405.

The control section 401 may judge, based on information for the measurements of the SSBs for the second carrier (for example, SMTC information), whether the data transmission to and/or reception at a specific timing (for example, within the SMTC window) using the first carrier is enabled or disabled.

The control section 401 may judge whether the data transmission and/or reception using the first carrier is enabled or disabled, based on whether or not the timings for the measurements of the SSBs (for example, the SMTC window) overlap between the first carrier and the second carrier.

The control section 401 may judge whether the data transmission and/or reception using the first carrier is enabled or disabled, based on whether or not the timings for the measurements of the SSBs (for example, the SMTC window) overlap between the first carrier and the second carrier.

The control section 401 may judge whether the data transmission and/or reception using the first carrier is enabled or disabled, based on whether or not the first carrier and the second carrier belong to the same frequency range.

The control section 401 may judge whether the data transmission and/or reception using the first carrier is enabled or disabled, based on the capability information regarding whether or not the measuring operation for the SSBs in the second carrier and the data transmitting/receiving operation in the first carrier affect each other.

If the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. For example, the measurement section 405 may perform, on one or both of the first carrier and the second carrier, the same-frequency measurements and/or the different-frequency measurements using SSBs The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

Hardware Structure

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 15:
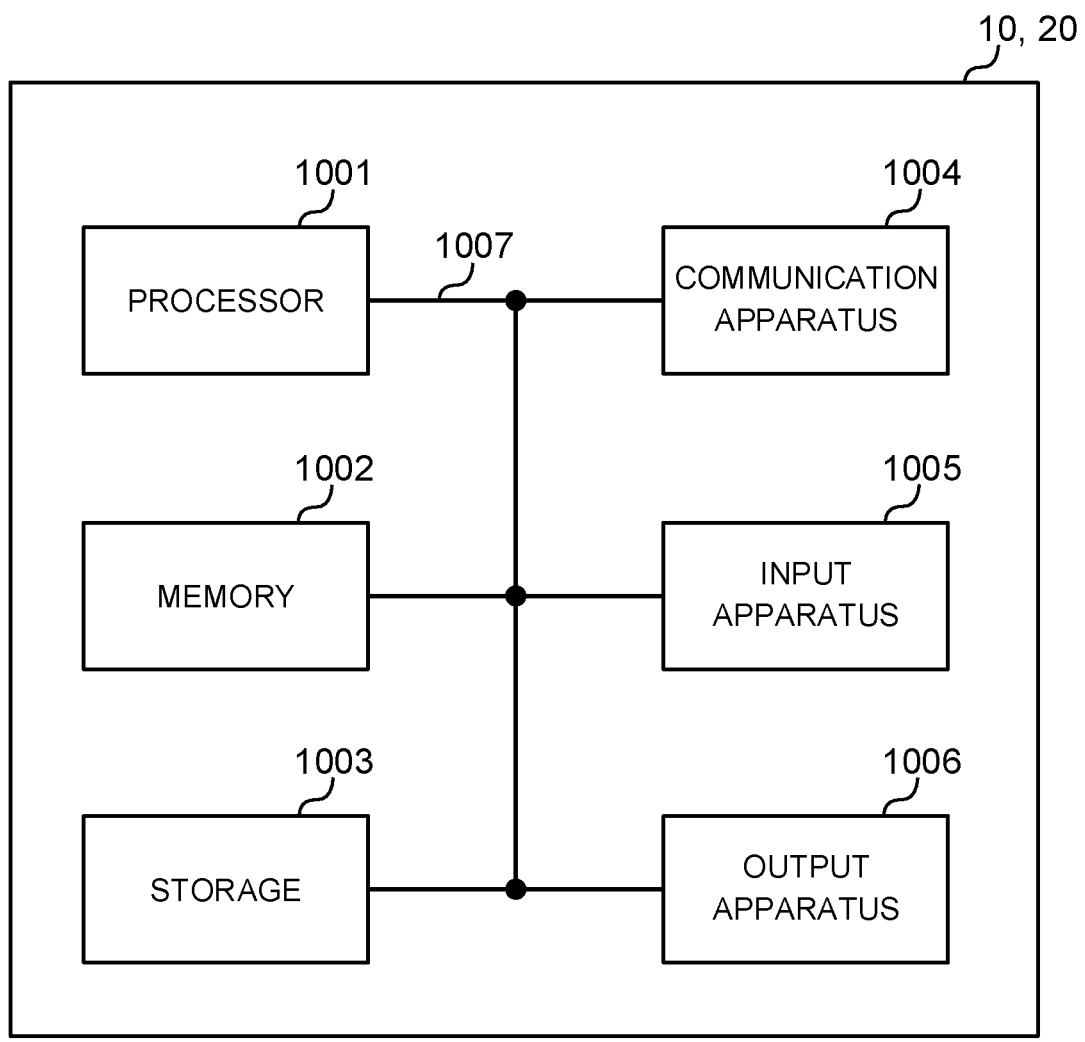
FIG. 15 is a diagram to show an example of a hardware structure of the radio base station and the user terminal according to one embodiment.

For example, a radio base station, a user terminal, and so on according to one embodiment of the present disclosure may function as a computer that executes the processes of the radio communication method of the present disclosure. FIG. 15 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)," and so on. The memory 1002 can store executable programs (program codes), software modules, and/or the like for implementing a radio communication method according to one embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

Variations

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI," or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to given values, or may be represented in another corresponding information. For example, radio resources may be specified by given indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other names, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and/or received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell," and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present disclosure may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the invention according to the present disclosure has been described in detail above, it should be obvious to a person skilled in the art that the invention according to the present disclosure is by no means limited to the embodiments described in this specification. The invention according to the present disclosure can be implemented with various corrections and in various modifications, without departing from the spirit and scope of the invention defined by the recitations of claims. Consequently, the description in this specification is provided only for the purpose of explaining examples, and should by no means be construed to limit the invention according to the present disclosure in any way.

What is claimed is:

1. A terminal comprising:
   a receiver that receives information regarding a measurement to be performed in a first serving cell using a synchronization signal block (SSB); and
   a processor that performs the measurement according to the information and determines whether transmission or reception can be performed using a second serving cell, at a specified timing, based on at least one of an SSB-based measurement timing configuration (SMTC) window duration and an SSB to be measured in regard to the first serving cell.

2. The terminal according to claim 1, wherein the determining of whether transmission or reception can be performed comprises determining whether transmission or reception of a physical uplink control channel (PUCCH), a physical uplink shared channel (PUSCH), a physical downlink control channel (PDCCH), a physical downlink shared channel (PDSCH), and a reference signal can be performed.

3. The terminal according to claim 1, wherein the processor determines whether transmission or reception can be performed using the second serving cell based on information regarding whether an index of an SSB transmitted by a neighboring cell can be derived based on a timing of the first serving cell.

4. The terminal according to claim 2, wherein the processor determines whether transmission or reception can be performed using the second serving cell based on information regarding whether an index of an SSB transmitted by a neighboring cell can be derived based on a timing of the first serving cell.

5. The terminal according to claim 1, wherein the processor determines whether transmission or reception can be performed using the second serving cell based on whether the first serving cell and the second serving cell belong to a same frequency range.

6. The terminal according to claim 2, wherein the processor determines whether transmission or reception can be performed using the second serving cell based on whether the first serving cell and the second serving cell belong to a same frequency range.

7. The terminal according to claim 3, wherein the processor determines whether transmission or reception can be performed using the second serving cell based on whether the first serving cell and the second serving cell belong to a same frequency range.

8. The terminal according to claim 1, wherein the specified timing is within the SMTC window duration.

9. The terminal according to claim 2, wherein the specified timing is within the SMTC window duration.

10. The terminal according to claim 3, wherein the specified timing is within the SMTC window duration.

11. The terminal according to claim 5, wherein the specified timing is within the SMTC window duration.

12. The terminal according to claim 1, wherein the receiver does not perform an intra-frequency measurement in a cell in which a measurement object is not configured.

13. The terminal according to claim 2, wherein the receiver does not perform an intra-frequency measurement in a cell in which a measurement object is not configured.

14. The terminal according to claim 3, wherein the receiver does not perform an intra-frequency measurement in a cell in which a measurement object is not configured.

15. The terminal according to claim 5, wherein the receiver does not perform an intra-frequency measurement in a cell in which a measurement object is not configured.

16. The terminal according to claim 8, wherein the receiver does not perform an intra-frequency measurement in a cell in which a measurement object is not configured.

17. The terminal according to claim 1, wherein the processor determines whether transmission or reception can be performed based on whether the terminal is capable of concurrent processing of an SSB, and at least one of data and a control channel, each having different numerologies.

18. A radio communication method for a terminal comprising:
   receiving information regarding a measurement to be performed in a first serving cell using a synchronization signal block (SSB);

performing the measurement according to the information; and determining whether transmission or reception can be performed using a second serving cell, at a specified timing, based on at least one of an SSB-based measurement timing configuration (SMTC) window duration and an SSB to be measured in regard to the first serving cell.

19. A base station comprising:

a transmitter that transmits information regarding a measurement to be performed in a first serving cell using a synchronization signal block (SSB), to a terminal; and a processor that determines whether transmission to the terminal or reception from the terminal can be performed using a second serving cell, at a specified timing, based on at least one of an SSB-based measurement timing configuration (SMTC) window duration and an SSB to be measured in regard to the first serving cell.

20. A system comprising:

a terminal that comprises:

a receiver that receives information regarding a measurement to be performed in a first serving cell using a synchronization signal block (SSB); and a processor that performs the measurement according to the information and determines whether transmission or reception can be performed using a second serving cell, at a specified timing, based on at least one of an SSB-based measurement timing configuration (SMTC) window duration and an SSB to be measured in regard to the first serving cell, and a base station that comprises:

a transmitter that transmits the information to the terminal.

* * * * *